United States Patent
Yuu et al.

(10) Patent No.: US 9,223,406 B2
(45) Date of Patent: Dec. 29, 2015

(54) SCREEN DISPLAY CONTROL METHOD OF ELECTRONIC DEVICE AND APPARATUS THEREFOR

(71) Applicant: Samsung Electronics Co., Ltd., Gyeonggi-do (KR)

(72) Inventors: Beyong-Ho Yuu, Gyeonggi-do (KR); Young-Ho Kim, Gyeonggi-do (KR); Kyu-Hyuk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 214 days.

(21) Appl. No.: 13/964,553

(22) Filed: Aug. 12, 2013

(65) Prior Publication Data

US 2014/0059501 A1    Feb. 27, 2014

(30) Foreign Application Priority Data

Aug. 27, 2012 (KR) .......... 10-2012-0093946
Sep. 10, 2012 (KR) .......... 10-2012-0100158

(51) Int. Cl.
*G06F 3/01* (2006.01)
*G06F 3/0488* (2013.01)

(52) U.S. Cl.
CPC ............ *G06F 3/017* (2013.01); *G06F 3/04883* (2013.01); *G06F 2203/04806* (2013.01)

(58) Field of Classification Search
CPC ..... G06F 3/033; G06F 3/041; G06F 3/04842; G06F 3/04817; H04N 5/232
See application file for complete search history.

(56) References Cited

U.S. PATENT DOCUMENTS

| | | | |
|---|---|---|---|
| 2008/0168384 A1 | 7/2008 | Platzer et al. | |
| 2009/0135162 A1* | 5/2009 | Van De Wijdeven et al. | 345/175 |
| 2011/0029917 A1* | 2/2011 | Um | 715/800 |
| 2011/0199314 A1* | 8/2011 | Laberge et al. | 345/173 |
| 2012/0147050 A1* | 6/2012 | Dai et al. | 345/660 |
| 2013/0141326 A1* | 6/2013 | Liou et al. | 345/156 |
| 2014/0211047 A1* | 7/2014 | Lee et al. | 348/240.99 |
| 2015/0067564 A1* | 3/2015 | Foley | 715/771 |

* cited by examiner

*Primary Examiner* — Rashawn Tillery
(74) *Attorney, Agent, or Firm* — Cha & Reiter, LLC.

(57) ABSTRACT

A method and apparatus for zooming in or out and displaying a screen according a gesture of a user is provided. The method includes sensing gesture input, determining whether the gesture input corresponds to a predetermined pattern of a first semicircle or semi oval shape, and zooming in or out the image displayed on the screen and displaying a zoomed in or zoomed out image on a screen wherein the zoom ratio is in proportion to a radius of a first semicircle or a radius of a long or short axis of a first semi oval when the gesture input is the pattern of the first semicircle or semi oval shape.

21 Claims, 27 Drawing Sheets

SCREEN DISPLAY CONTROL METHOD OF ELECTRONIC DEVICE AND APPARATUS THEREFOR

CLAIM OF PRIORITY

This application claims the benefit under 35 U.S.C. §119 (a) of Korean patent applications filed in the Korean Intellectual Property Office on Aug. 27, 2012 and Sep. 10, 2012 and assigned Serial No. 10-2012-0093946 and 10-2012-0100158, the entire disclosures of which are hereby incorporated by reference in its entirety.

BACKGROUND

1. Field of the Invention

The present disclosure relates to a screen display control method and an electronic device thereof. More particularly, the present invention relates to a method and apparatus for zooming in or out of a screen.

2. Description of the Related Art

Recently, portable terminals have provided various functions to improve and enhance the convenience of a user and have also been on a trend of being miniaturized and lightened simultaneously. It has therefore become difficult to have various input keys according to the miniaturized trend of each of the portable terminals. There have been developed methods of easily inputting information in a miniaturized state of each of the portable terminals. For example, there is a portable terminal which uses a touch screen panel as an input means.

The portable terminal which uses the touch screen panel as the input means provides a function for controlling screen display using the touch screen panel, that is, a function for zooming in or out a screen. For example, a conventional portable terminal provides a method of zooming in/out a screen using a multi-touch method of finger interaction with the screen.

FIGS. 1A and 1B illustrate a method of zooming in/out a screen using a multi-touch finger interaction in a conventional portable terminal.

As shown in FIGS. 1A and 1B, in the method using the multi-touch, the conventional portable terminal recognizes two points touched at particular points by two fingers of a user and zooms in or out and displays a screen according to a distance change between the two points. For example, as shown in FIG. 1B, if a distance between two points is decreased, a screen is zoomed in. As shown in FIG. 1A, if the distance between the two points is increased, the screen is zoomed out.

That is, because the conventional portable terminal zooms in/out a screen according to a distance change of two fingers of the user, in order to zoom in or out the screen to a desired size of the screen, there is a disadvantage in that the user comes in contact with the screen, zooms in or out the screen, and repeats a plurality of operations in which he or she takes his or her fingers off the screen to restart the method of increasing and decreasing the distance between the two points.

Also, because the user performs a single touch to perform a scroll and then must perform a multi-touch when he or her wants to scale a screen according to a his or her action pattern, there is problem in that he or her must change the single touch to the multi-touch in order to switch from one interactive task to another interactive task, in other words from scrolling to zooming.

SUMMARY

An aspect of the present invention is to solve at least the above-mentioned problems and/or disadvantages and to provide at least some of the advantages described below. Accordingly, an aspect of the present invention is to provide an apparatus and method for zooming in or out and displaying a screen according to a touch of a user.

Another aspect of the present invention is to provide an apparatus and method for recognizing a circular or oval touch and zooming in or out and displaying a screen in a portable terminal.

Another aspect of the present invention is to provide an apparatus and method for zooming in or out a screen in proportion to a radius of a first semicircle or a radius of a long or short axis of a first semi oval and additionally zooming in or out the zoomed-in or zoomed-out screen according to an arc length of a second semicircle or semi oval.

Another aspect of the present invention is to provide an apparatus and method for zooming in or out and displaying a screen based on a single touch in a portable terminal.

In accordance with an aspect of the present invention, a screen display control method of an electronic device is provided. The screen display control method includes sensing gesture input; determining whether the gesture input corresponds to a predetermined pattern of a first semicircle or semi oval shape; and zooming in or out the image displayed on the screen and displaying a zoomed in or zoomed out image on a screen wherein the zoom ratio is in proportion to a radius of a first semicircle or a radius of a long or short axis of a first semi oval when the gesture input is the pattern of the first semicircle or semi oval shape.

In accordance with another aspect of the present invention, a screen display control apparatus is provided. The screen display control apparatus includes a touch screen for sensing gesture input; and a controller for determining whether the gesture input corresponds to a predetermined pattern of a first semicircle or semi oval shape and zooming in or out the image displayed on the screen and displaying a zoomed in or zoomed out image on a screen wherein the zoom ratio is in proportion to a radius of a first semicircle or a radius of a long or short axis of a first semi oval when the gesture input is the pattern of the first semicircle or semi oval shape.

In accordance with another aspect of the present invention, an electronic device is provided. The electronic device includes a touch screen, one or more processors, a memory, and one or more programs, each of the one or more programs which is stored in the memory and is configured to be executed by one of the one or more processors, wherein each of the one or more programs includes an instruction for sensing gesture input, determining whether the gesture input corresponds to a predetermined pattern of a first semicircle or semi oval shape, and zooming in or out and displaying a screen in proportion to a radius of a first semicircle or a radius of a long or short axis of a first semi oval when the gesture input is the predetermined pattern of the first semicircle or semi oval shape.

In accordance with another aspect of the present invention, an apparatus for scaling an electronic document in a portable terminal is provided. The apparatus includes a display unit for outputting the electronic document and a controller for analyzing a trajectory of a single touch gesture when the single touch gesture is input on a screen on which the electronic document is output, zooming in the electronic document when the single touch gesture is a first gesture as a result of the analysis, and zooming out the electronic document when the single touch gesture is a second gesture, wherein the first gesture is a gesture which progresses in a first direction and then progress in a second direction and wherein a progress length of the second direction exceeds a progress length of the first direction.

In accordance with another aspect of the present invention, a method of scaling an electronic document in a portable terminal is provided. The method includes analyzing a trajectory of a single touch gesture when the single touch gesture is input on a screen on which the electronic document is output; determining if the single touch gesture is a first gesture or a second gesture and then zooming in the electronic document when the single touch gesture is a first gesture; and zooming out the electronic document when the single touch gesture is a second gesture, wherein the first gesture is a gesture which progresses a length in a first direction and then progress a length in a second direction and wherein a progress length of the second direction exceeds a progress length of the first direction.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Exemplary embodiments of the present invention will be described herein below with reference to the accompanying drawings to assist in a comprehensive understanding of exemplary embodiments of the invention as defined by the claims and their equivalents. In the following description, well-known functions or constructions are not described in detail since they would obscure the understanding of the subject matter of the present invention in unnecessary detail by a person of ordinary skill in the art with unnecessary detail of the well-known functions and structures.

Therefore, the terms used herein should be understood based on the descriptions made herein in view of the ordinary level of skill in the art. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Hereinafter, a description will be given for a screen display control method and an electronic device using the same according to one embodiment of the present invention.

Figure 2:
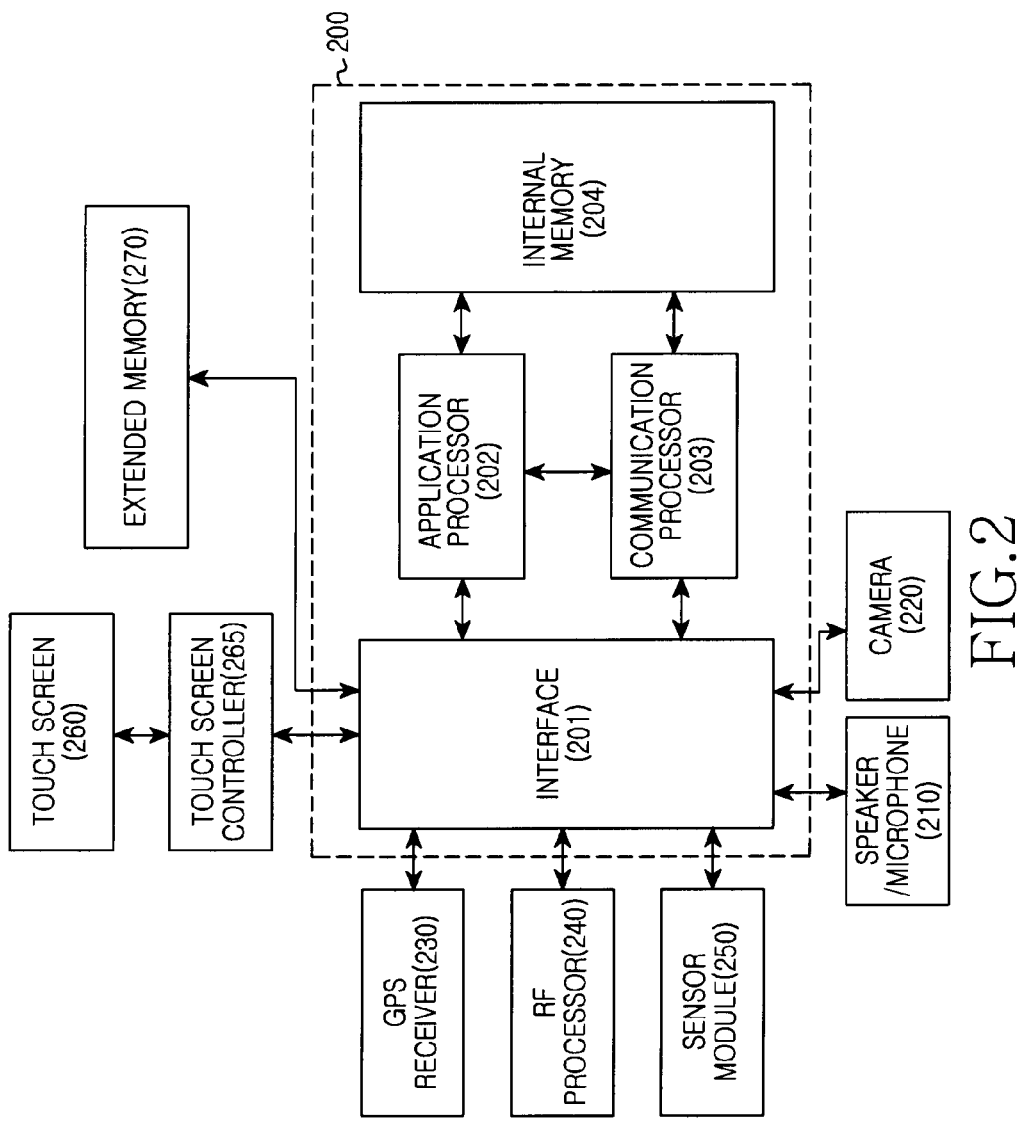
FIG. 2 is a block diagram illustrating configuration of an electronic device according to one embodiment of the present invention.

FIG. 2 is a block diagram illustrating configuration of an electronic device according to one embodiment of the present invention;

The electronic device may be a portable electronic device. The electronic device may be any one of apparatuses, such as a portable terminal, a mobile phone, a mobile pad, a media player, a tablet computer, a handheld computer, and a Personal Digital Assistant (PDA). Also, the electronic device may be a certain portable electronic device including a device in which two or more functions are combined among these apparatuses.

Hereinafter, a description will be given for a screen display control method and an apparatus therefore in a portable terminal according to one embodiment of the present invention.

Referring to FIG. 2, the electronic device includes a controller 200, a speaker/microphone 210, a camera 220, a Global Positioning System (GPS) receiver 230, a Radio Frequency (RF) processor 240, a sensor module 250, a touch screen 260, a touch screen controller 265, and an extended memory 270.

The controller 200 may include an interface 201, one or more processors such as an application processor 202 and a communication processor 203, and an internal memory 204. In some cases, the whole controller 200 is referred to as a processor. The interface 201, the application processor 202, the communication processor 203, and the internal memory 204 may be separately configured or be integrated in one or more Integrated Circuits (ICs).

The application processor 202 executes several software programs and performs several functions for the electronic device. Also, the communication processor 203 performs process and control for voice communication and data communication. Also, in addition to this normal function, the application processor 202 and the communication processor 203 plays a role in executing a specific software module (instruction set) stored in the extended memory 270 or the internal memory 204 and performing several specific functions corresponding to the software module. That is, the application processor 202 and the communication processor 203 interworks with the software modules stored in the extended memory 270 or the internal memory 204 to execute the software modules and thus performs the method according to one embodiment of the present invention.

In one embodiment of zooming in/out a screen using a single touch, the application processor 202 senses a gesture of a user (see, FIGS. 6A, 6B, 7A, and 7B) and determines whether the sensed gesture corresponds to a gesture forming a touch pattern of a first semicircle or semi oval clockwise. When the sensed touch corresponds to the gesture forming the touch pattern of the first semicircle or semi oval clockwise, the application processor 202 controls the display and zooms in and displays a first screen in proportion to a radius of the first semicircle or a radius of a long or short axis of the first semi oval (see, FIGS. 6A and 6B). The application processor 202 controls and zooms out and displays the first screen in proportion to the radius of the first semicircle or the radius of the long or short axis of the first semi oval (see, FIGS. 7A and 7B) Such that the display of the first screen in proportion to the radius of the first semicircle or the radius of the long or short axis of the first semi oval is in comparison to the entire screen. In other words the proportion of the radius of the first semicircle or the radius of the long or short axis of the first semi oval is determined with comparison to the entire screen size. The application processor 202 determines whether a second semicircle or semi oval gesture of the user is sensed. When the second semicircle or semi oval gesture is sensed, the application processor 202 controls and zooms in or out and displays the zoomed-in or zoomed-out first screen additionally according to an arc length of the second semicircle or semi oval.

For example, in one embodiment of zooming in a screen using a circular or oval gesture of the user, the application processor 202 senses a clockwise first semicircle or semi oval gesture of the user and zooms in and displays a first screen in proportion to a radius of a clockwise first semicircle or a radius of a long or short axis of a clockwise first semi oval, and determines whether another second semicircle or semi oval gesture corresponding to the first semicircle or semi oval gesture is sensed clockwise. When the other second semicircle or semi oval gesture corresponding to the first semicircle or semi oval gesture is sensed clockwise, the application processor 202 zooms in and displays the zoomed-in first screen additionally according to an arc length of the other second semicircle or semi oval. When the other second semicircle or semi oval gesture corresponding to the first semicircle or semi oval gesture is not sensed clockwise, that is, when another second semicircle or semi oval gesture is sensed counterclockwise, the application processor 202 zooms out and displays the zoomed-in first screen according to an arc length of the another second semicircle or semi oval.

For example, in one embodiment of zooming out a screen using a circular or oval gesture of the user, the application processor 202 senses a counterclockwise first semicircle or semi oval gesture of the user and zooms out and displays a second screen in proportion to a radius of the counterclockwise first semicircle or a radius of a long or short axis of the counterclockwise first semi oval, and determines whether another second semicircle or semi oval gesture corresponding to the first semicircle or semi oval gesture is sensed counterclockwise. When the other second semicircle or semi oval gesture corresponding to the first semicircle or semi oval gesture is sensed counterclockwise, the application processor 202 controls the display and zooms in and displays the zoomed-in first screen additionally according to an arc length of the other second semicircle or semi oval. When the other second semicircle or semi oval gesture corresponding to the first semicircle or semi oval gesture is not sensed counterclockwise, that is, when another second semicircle or semi oval gesture is sensed clockwise, the application processor 202 controls the display and zooms out and displays the zoomed-out first screen according to an arc length of the another second semicircle or semi oval.

Also, the application processor 202 may scale an electronic document according to a gesture input on a screen. For example, the application processor 202 output an electronic document through the touch screen 260 and receives a single touch gesture from the user through the touch screen 260. Herein, the single touch gesture means a gesture implemented by one finger or stylus pen of the user. The application processor 202 analyzes a trajectory of the single touch gesture which is being input and verifies whether the input single touch gesture is a first gesture based on the analyzed result. Herein, the first gesture means a gesture, which is preset, for requesting the zoom-in of an output electronic document. As a result of the verification, when the input single touch gesture is the first gesture, the application processor 202 zooms in the output electronic document. On the other hand, when the input single touch gesture is not the first gesture, the application processor 202 verifies whether the input single touch gesture is a second gesture. Herein, the second gesture means a gesture, which is preset, for requesting the zoom-out of the output electronic document. As a result of the verification, when the input single touch gesture is the second gesture, the application processor 202 zooms out the output electronic document. On the other hand, when the input single touch gesture is not the second gesture, the application processor 202 performs a specific function corresponding to the input single touch gesture. Herein, the specific function may be a scroll function. For example, when the output electronic document is an image, the scroll function means a function for outputting a next image of the output image. When the output electronic document is an e-book, the scroll function means a function for outputting a next page of the output page. When the output electronic document is a webpage, the scroll function means a function for outputting the other WebPages except for an output webpage among all WebPages.

The first gesture means a gesture which progresses in a predetermined first direction and then processes in a predetermined second direction. A progress length in the second direction in the first gesture exceeds a progress length in the first direction in the first gesture. The second gesture, as a gesture which progresses in a direction opposite to that of the first gesture, means a gesture which progresses in the predetermined second direction and then progresses in the predetermined first direction. A progress length in the first direction in the second gesture exceeds a progress length in the second direction in the second gesture. For one example, when the first gesture is a gesture which progresses in an upward direction and then progresses a downward direction by a finger or stylus pen of the user on a screen of the portable terminal, the second gesture may be a gesture which progresses in the downward direction and then progresses in the upward direction. For another example, when the first gesture is a gesture which progresses in a left direction and then progresses a right direction by a finger or stylus pen of the user on the screen of the portable terminal, the second gesture may be a gesture which progresses in the right direction and then progresses in the left direction. For another example, when the first gesture is a gesture which progresses in a direction of 135 degrees from a horizontal line and then progresses a direction of 315 degrees from the horizontal line by the finger or stylus pen of the user on the screen of the portable terminal, the second gesture may be a gesture which progresses in the direction of 315 degrees from the horizontal line and then progresses in the direction of 135 degrees from the horizontal line.

An operation in which the application processor 202 analyzes a trajectory of the input gesture will be described in detail as follows.

After an electronic document is output through the touch screen 260, the application processor 202 recognizes whether a screen is touched by the user. If the touch of the screen is recognized, the application processor 202 verifies a coordinate on a screen according to the touch until the touch is released and generates a virtual scaling line based on a touch start coordinate. Herein, the application processor 202 may display a coordinate as an x and y coordinate system.

Herein, the touch start coordinate means an initial coordinate on a screen, at the location on which the touch is started. The scaling line means a line virtually generated for scaling (zooming in or out) an electronic document. For one example, when the first gesture and the second gesture are gestures using an upward direction and a downward direction, the scaling line may be a horizontal line including the touch start coordinate. For another example, when the first gesture and the second gesture are gestures using a left direction and a right direction, the scaling line may be a vertical line including the touch start coordinate. For another example, when the first gesture and the second gesture are gestures using a direction of 135 degrees from a horizontal line and a direction of 315 degrees from the horizontal line, the scaling line may be a diagonal line including the touch start coordinate.

The application processor 202 verifies whether a touch progress direction is a first direction. Herein, the first direction means a predetermined specific direction. For example, the first direction may be an upward direction, a downward direction, a left direction, a right direction, a direction of 133 degrees from a horizontal line, or a direction of 325 degrees from a horizontal line. The touch progress direction means a direction in which a finger or stylus pen of the user progresses.

As a result of the verification, when the touch progress direction is the first direction, the application processor 202 verifies at least one of a first touch distance and a first touch time. Herein, the first touch distance means a distance from a touch start coordinate to a current touch coordinate for a touch which progresses in the first direction. The first touch time means a time from a touch start time point to a current touch time point for the touch which progresses in the first direction.

The application processor 202 verifies whether any one of the verified first touch distance and the verified first touch time is less than or equal to at least one of a predetermined first distance and a predetermined first time. As a result of the verification, when the any one of the verified first touch distance and the verified first touch time exceeds at least the one of the predetermined first distance and the predetermined first time, the application processor 202 performs a scroll function based on the first direction.

On the other hand, when the any one of the verified first touch distance and the verified first touch time is less than or equal to at least the one of the predetermined first distance and the predetermined first time, the application processor 202 verifies whether a touch progress direction is changed from the first direction to a second direction. Herein, the second direction means a direction opposite to the first direction. For one example, when the first direction is an upward direction, the second direction may be a downward direction. For another example, when the first direction is a left direction, the second direction may be a right direction. For another example, when the first direction is a direction of 135 degrees from a horizontal line, the second direction may be a direction of 315 degrees from the horizontal line.

As a result of the verification, when the touch progress direction is changed to the second direction, the application processor 202 compares a coordinate (hereinafter, referred to as a current touch coordinate) of a point of a current touch which is progressing in the second direction with the plurality of coordinates forming a virtual scaling line and verifies whether any one of a plurality of coordinates is identical to the current touch coordinate. That is, the application processor 202 verifies whether a gesture passes the virtual scaling line.

As a result of the verification, when the any one of the plurality of coordinates is identical to the current touch coordinate, the application processor 202 verifies a second touch distance indicating a distance from the identical coordinate to the current touch coordinate. The application processor 202 verifies whether the second touch distance is greater than or equal to a predetermined second distance. As a result of the verification, when the second touch distance is greater than or equal to the predetermined second distance, the application processor 202 determines a zoom-in magnification according to the second touch distance and zooms in the electronic document at the zoom-in magnification determined based on a touch start coordinate of the electronic document.

On the other hand, when the touch progress direction is not identical to the first direction, the application processor 202 verifies whether the touch progress direction is the second direction. As a result of the verification, when the touch progress direction is identical to the second direction, the application processor 202 verifies at least one of a third touch distance and a second touch time. Herein, the third touch distance means a distance from a touch start coordinate to the current touch coordinate for a touch which progresses in the second direction. The second touch time means a time from a touch start time point to a current touch time point for a touch which progresses in the second direction.

The application processor 202 verifies whether at least any one of the verified third touch distance and the verified second touch time is less than or equal to at least any one of a predetermined third distance and a predetermined second time. As a result of the verification, when at least the any one of the verified third touch distance and the verified second touch time exceeds at least the any one of the predetermined third distance and the predetermined second time, the application processor 202 performs a scroll function based on the second direction.

On the other hand, when at least the any one of the verified third touch distance and the verified second touch time is less than or equal to at least the any one of the predetermined third distance and the predetermined second time, the application processor 202 verifies whether a touch progress direction is changed from the second direction to the first direction. As a result of the verification, when the touch progress direction is changed to the first direction, the application processor 202 compares a current touch coordinate which is progressing in the first direction with a plurality of coordinates forming a virtual scaling line and verifies whether any one of the plurality of coordinates is identical to the current touch coordinate. That is, the application processor 202 verifies whether a gesture passes a virtual scaling line.

As a result of the verification, when the any one of the plurality of coordinates is identical to the current touch coordinate, the application processor 202 verifies a fourth touch distance indicating a distance from the identical coordinate to the current touch coordinate. The application processor 202 verifies whether the fourth touch distance is greater than or equal to a predetermined fourth distance. As a result of the verification, when the fourth touch distance is greater than or equal to the fourth distance, the application processor 202 determines a zoom-out magnification according to the fourth touch distance and zooms out the electronic document at a zoom-out magnification determined based on a touch start coordinate of the electronic device.

A variety of functions of the electronic device, which are described above or to be described later, may be executed by one or more streaming processing, hardware including an Application Specific Integrated Circuit (ASIC), software, and/or combination of them.

On the other hand, another processor (not shown) may include one or more data processors, an image processor, or a codec. Another processor may separately include the data processors, the image processor, or the codec. Also, another processor may include several processors for performing different functions. The interface 201 connects to the touch screen controller 265 of the electronic device with the extended memory 270.

The sensor module may connect to the interface 201 and perform several functions. For example, a motion sensor and an optical sensor may connect to the interface 201, sense motion of the electronic device, and sense light from the outside. Furthermore, a position measurement system and other sensors such as a temperature sensor, a bio-sensor, etc. may connect to the interface 250 and perform related functions.

The camera 220 may be combined to the sensor module 250 through the interface 201 and perform a camera function like a photo and video clip recording function.

The RF processor 240 performs a communication function. For example, the RF processor 240 converts an RF signal into a baseband signal and provides the baseband signal to the communication processor 203 under control of the communication processor 203. The RF processor 240 converts a baseband signal from the communication processor 203 into an RF signal and transmits the RF signal under control of the communication processor 203. Herein, the communication processor 203 processes a baseband signal using various communication schemes. The communication scheme may include, but is not limited to, at least one of a Global System for Mobile communication (GSM) communication scheme, an Enhanced Data GSM Environment (EDGE) communication scheme, a Code Division Multiple Access (CDMA) communication scheme, a W-CDMA communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme, or/and a Bluetooth communication scheme.

Figures 1A, 1B:
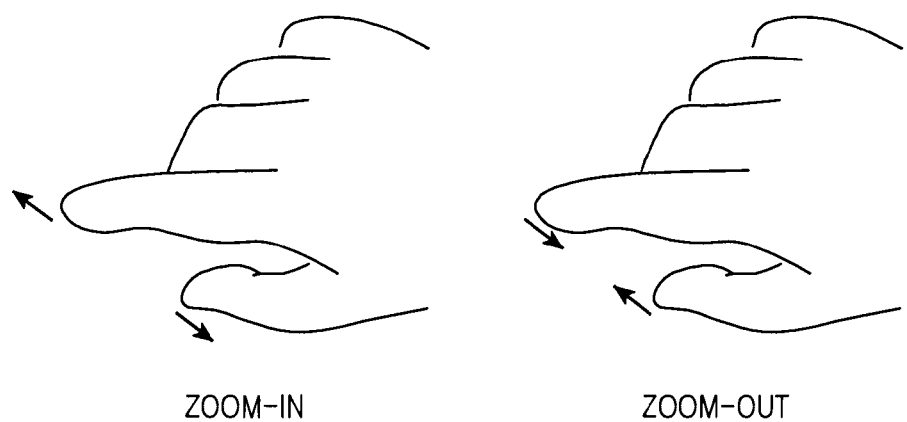
FIGS. 1A and 1B illustrate a method of zooming in/out using a multi-touch gesture in a conventional portable terminal.

The speaker/microphone 210 may be responsible for inputting and outputting an audio stream, such as a voice recognition function, a voice copy function, a digital recording function, and a phone call function. That is, the speaker/microphone 210 converts a sound or voice signal into an electric signal or converts an electric signal into a sound or voice signal. Although it is not shown in FIG. 1, an attachable and detachable earphone, headphone, or headset may connect to the electronic device through an external port.

The touch screen controller 265 may be coupled to the touch screen 260. The touch screen 260 and the touch screen controller 265 may detect, but is not limited to, contact and motion or the stopping of contact or motion using not only capacitive, resistive, infrared ray, and surface acoustic wave technologies for determining one or more contact points with the touch screen 260 but also a certain multi-touch sensing technology including other proximity sensor arrangement or other elements.

The touch screen 260 provides an input/output interface between the electronic device and the user. That is, the touch screen 260 transmits touch input of the user to the electronic device. Also, the touch screen 260 is a medium for displaying output from the electronic device to the user. That is, the touch screen 260 displays visual output to the user. This visual output can include a text type, a graphic type, a video type, and a combined type which may include any combination of text, graphics and video.

The touch screen 260 may be one of several different types of displays. For example, the touch screen 260 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The GPS receiver 230 converts a signal received from an artificial satellite into information such as a position, a speed, and a time. For example, a distance between the satellite and the GPS receiver 230 is calculated by multiplying the velocity of light by a signal arrival time. A position of the electronic device is measured by obtaining accurate positions and distances of three satellites and applying the obtained value to a well-known trilateration principle.

The extended memory 270 or the internal memory 204 may include a high-speed Random Access Memory (RAM) such as one or more magnetic storages, a non-volatile memory, one or more optical storages, and/or a flash memory (e.g., a NAND flash memory or a NOR flash memory).

The extended memory 270 or the internal memory 204 stores software components. The software components include an Operating System (OS) software module, a communication software module, a graphic software module, a user interface software module, a CODEC software module, a camera software module, one or more application software modules, etc. Also, the modules which are the software components may be expressed in a set of instructions. Accordingly, the modules are expressed in an instruction set. Also, the modules are expressed in software programs.

The OS software module includes several software components for controlling a general system operation. For example, control of this general system operation means memory management and control, storage hardware (device) control and management, power control and management, etc. This OS software module also performs a function for smoothly communicating between several hardware components (devices) and software components (modules).

The communication software module may communicate with other electronic devices such as a computer, a server, and/or a portable terminal through the RF processor 240. The communication software module is configured by a protocol structure corresponding to a corresponding communication scheme.

The graphic software module includes several software components for providing and displaying graphics on the touch screen 260. The term "graphics" means that texts, WebPages, icons, digital images, videos, animations, etc. are included.

The user interface software module includes several software components related to a user interface. The user interface software module includes contents about whether a state of a user interface is changed to any state, whether a state of a user interface is changed in any condition, etc.

The camera software module includes camera-related software components which may perform camera-related processes and functions.

The application software module includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, etc. The extended memory 270 or the internal memory 204 may include additional modules (instructions) in addition to the modules described above. Or, if necessary, the extended memory 270 or the internal memory 204 may not include some of the modules (instructions) described above.

In accordance with one embodiment of the present invention, the application software module includes instructions (see, FIGS. 3 to 5) for zooming in/out a screen using a single gesture in the electronic device.

The electronic device includes an instruction according to one embodiment for zooming in/out a screen using a single touch. The electronic device senses a first semicircle or semi oval gesture of a user (see, FIGS. 6A, 6B, 7A, and 7B) and determines whether the sensed gesture corresponds to a clockwise first semicircle or semi oval pattern. When the sensed touch corresponds to the clockwise first semicircle or semi oval pattern, the electronic device zooms in and displays a first screen in proportion to a radius of the first semicircle or a radius of a long or short axis of the first semi oval (see, FIGS. 6A and 6B). The electronic device zooms out and displays the first screen in proportion to the radius of the first semicircle or the radius of the long or short axis of the first semi oval (see, FIGS. 7A and 7B). The electronic device determines whether a second semicircle or semi oval gesture of the user is sensed. When the second semicircle or semi oval is sensed, the electronic device zooms in or out and displays the zoomed-in or zoomed-out first screen additionally according to an arc length of the second semicircle or semi oval.

For example, the electronic device includes an instruction for zooming in a screen using a circular or oval gesture of the user. The electronic device senses a clockwise first semicircle or semi oval gesture of the user and zooms in and displays the first screen in proportion to a radius of a clockwise first semicircle or a radius of a long or short axis of a clockwise first semi oval, and determines whether another second semicircle or semi oval gesture corresponding to the first semicircle or semi oval gesture is sensed clockwise. When the other second semicircle or semi oval gesture corresponding to the first semicircle or semi oval gesture is sensed clockwise, the electronic device zooms in and displays the zoomed-in first screen additionally according to an arc length of the other second semicircle or semi oval. When the other second semicircle or semi oval gesture corresponding to the first semicircle or semi oval gesture is not sensed clockwise, that is, when another second semicircle or semi oval gesture is sensed counterclockwise, the electronic device zooms out and displays the zoom-in first screen according to an arc length of the another second semicircle or semi oval.

For example, the electronic device includes an instruction for zooming out a screen using a circular or oval gesture of the user. The electronic device senses a counterclockwise first semicircle or semi oval gesture of the user and zooms out and displays the second screen in proportion to a radius of the counterclockwise first semicircle or a radius of a long or short axis of the counterclockwise first semi oval, and determines whether the other second semicircle or semi oval gesture corresponding to the first semicircle or semi oval gesture is sensed counterclockwise. When the other second semicircle or semi oval gesture corresponding to the first semicircle or semi oval gesture is sensed counterclockwise, the electronic device zooms in and displays the zoomed-in first screen additionally according to an arc length of the other second semicircle or semi oval. When the other second semicircle or semi oval gesture corresponding to the first semicircle or semi oval gesture is not sensed clockwise, that is, when another second semicircle or semi oval gesture is sensed counterclockwise, the electronic device zooms in and displays the zoomed-out first screen according to an arc length of the another second semicircle or semi oval.

In addition, the application software module includes instructions (see, FIGS. 12 to 15) for scaling an electronic document according to a gesture input on a screen.

A variety of functions of the electronic device, which are described above or to be described later, may be executed by one or more streaming processing, hardware including an ASIC, software, and/or combination of them.

Figure 3:
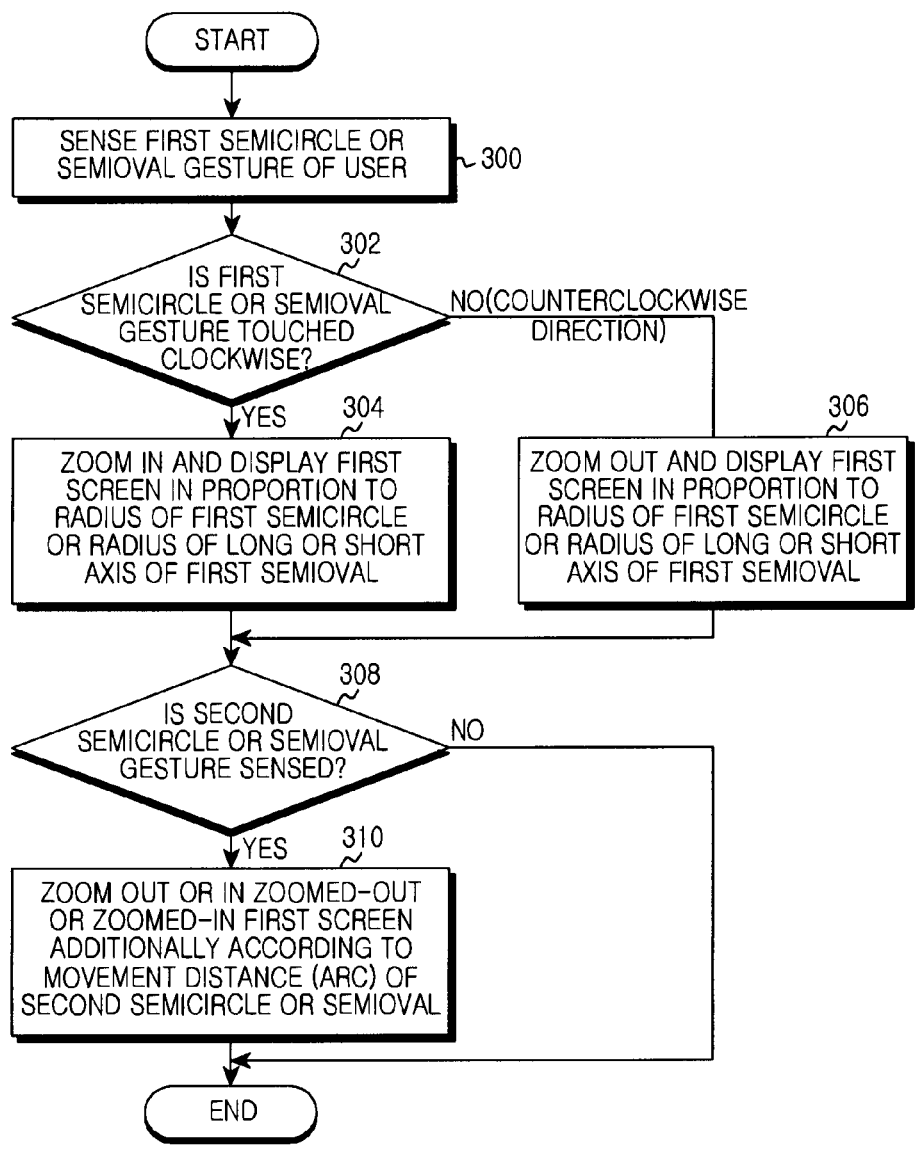
FIG. 3 is a flowchart illustrating a process of zooming in/out a screen using a single touch in an electronic device according to one embodiment of the present invention.

FIG. 3 is a flowchart illustrating a process of zooming in/out a screen using a single touch in an electronic device according to one embodiment of the present invention.

Referring to FIG. 3, the electronic device senses a first semicircle or semi oval gesture of a user (see, FIGS. 6A, 6B, 7A, and 7B) in step 300. The electronic device determines whether the sensed first semicircle or semi oval gesture is touched clockwise in step 302. When the sensed first semicircle or semi oval gesture is touched clockwise, the electronic device proceeds to step 304. When the sensed first semicircle or semi oval gesture is not touched clockwise, the electronic device proceeds to step 306. The electronic device zooms in and displays a first screen in proportion to a radius of the first semicircle or a radius of a long or short axis of the first semi oval in step 304 (see, FIGS. 6A and 6B). The electronic device zooms out and displays the first screen in proportion to the radius of the first semicircle or the radius of the long or short axis of the first semi oval in step 306 (see, FIGS. 7A and 7B).

The electronic device determines whether a second semicircle or semi oval gesture of the user is sensed by the user. Herein, the second semicircle or semi oval gesture connects to at least one of two points of the first semicircle or semi oval and a clockwise or counterclockwise semicircle or semi oval gesture. When the second semicircle or semi oval is sensed, the electronic device proceeds to step 310. When the second semicircle or semi oval is not sensed, the electronic device ends the algorithm of FIG. 3.

The electronic device zooms in or out and displays the zoomed-in or zoomed-out first screen additionally according to an arc length of the second semicircle or semi oval in step 310.

Figure 4:
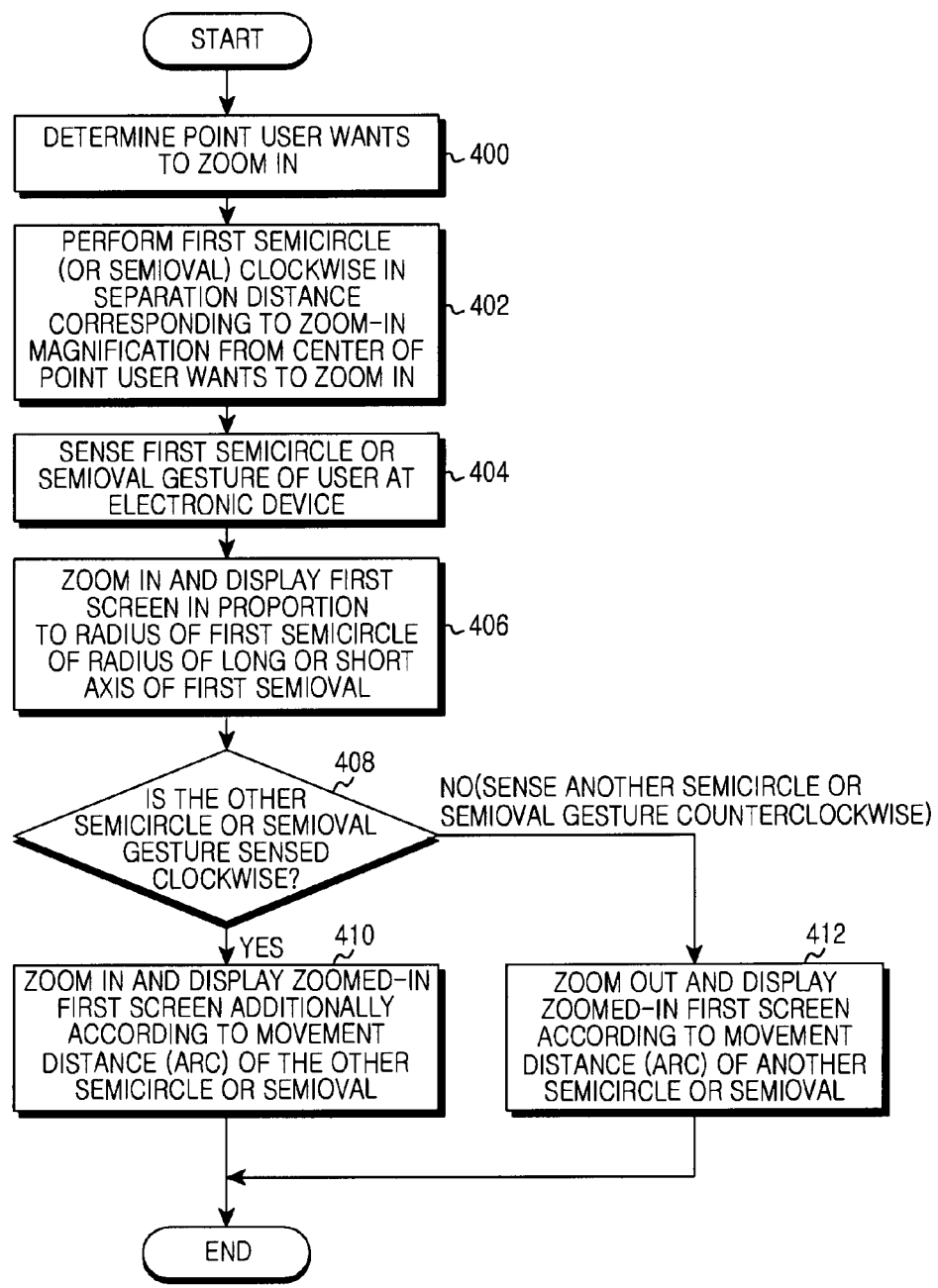
FIG. 4 is a flowchart illustrating a process of zooming in a screen using a circular or oval gesture of a user according to one embodiment of the present invention.

FIG. 4 is a flowchart illustrating a process of zooming in a screen using a circular or oval gesture of a user according to one embodiment of the present invention.

Referring to FIG. 4, the user determines a point he or she wants to zoom in step 400. The electronic device performs a first semicircle or semi oval clockwise in a separation distance corresponding to a zoom-in magnification from the center of the point the user wants to zoom in step 402.

The electronic device senses a clockwise first semicircle or semi oval gesture of the user in step 404. The electronic device zooms in and displays a first screen in proportion to a radius of a clockwise semicircle or semi oval of the user in step 406. That is, the more the radius of the semicircle or semi oval is broadened, the more a zoom-in magnification is increased. On the other hand, the more the radius of the semicircle or semi oval is narrowed, the more a zoom-in magnification is decreased.

The electronic device determines whether the other second semicircle or semi oval gesture corresponding to the first semicircle or semi oval gesture is sensed clockwise in step 408. That is, the electronic device determines whether to zoom in or out the zoomed-in first screen additionally in proportion to a radius of the clockwise first semicircle or a radius of a long or short axis of the clockwise first semi oval of the user (see, FIG. 8).

When the other second semicircle or semi oval gesture corresponding to the first semicircle or semi oval gesture is sensed clockwise, the electronic device proceeds to step 410 and zooms in and displays the zoomed-in first screen additionally according to an arc length of the other second semicircle or semi oval.

On the other hand, when the other second semicircle or semi oval gesture corresponding to the first semicircle or semi oval gesture is not sensed clockwise, that is, when another second semicircle or semi oval gesture is sensed counterclockwise, the electronic device proceeds to step 412 and zooms out and displays the zoomed-in first screen according to an arc length of the another second semicircle or semi oval.

The electronic device ends the algorithm of FIG. 4.

Figure 5:
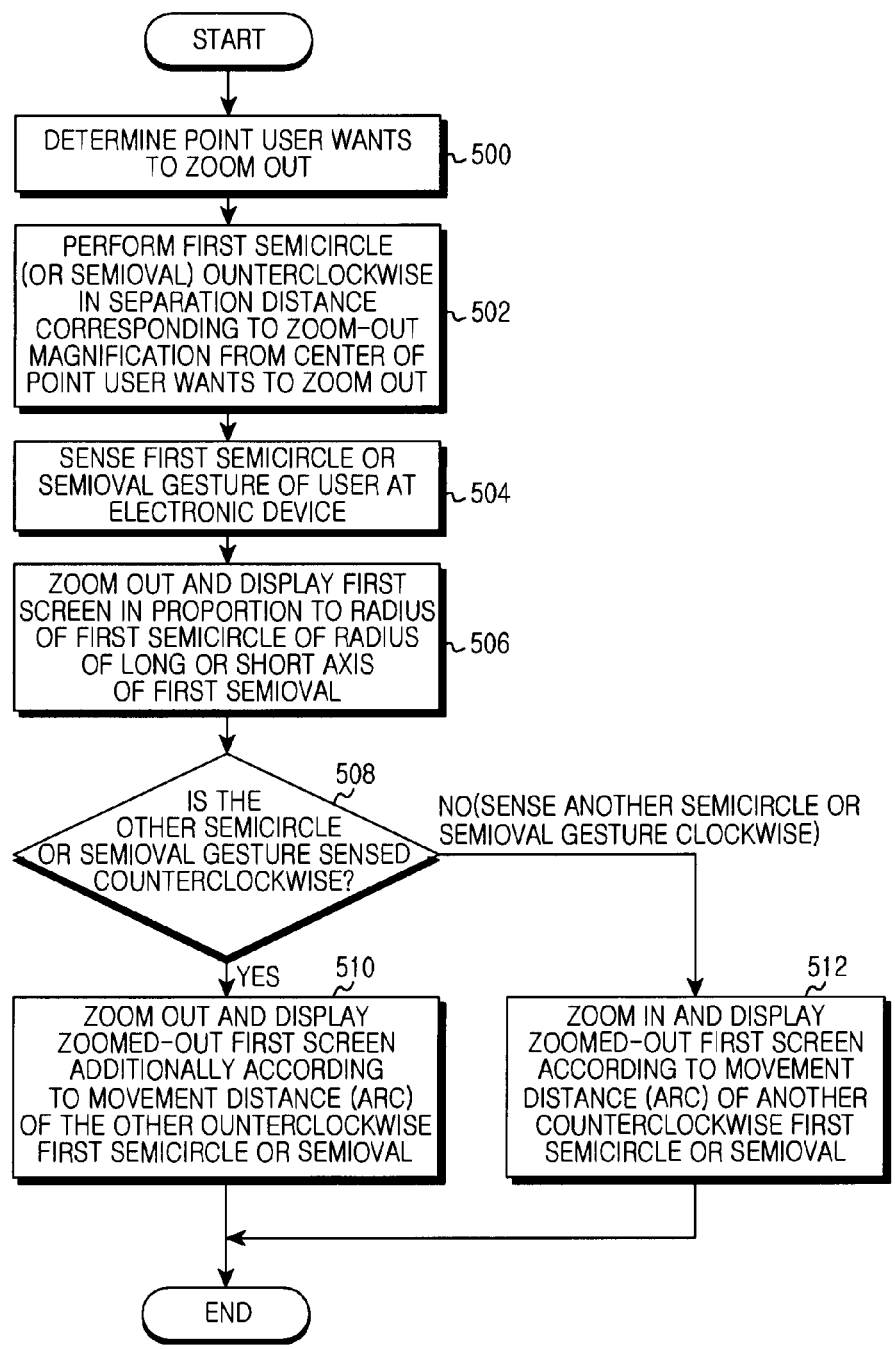
FIG. 5 is a flowchart illustrating a process of zooming out a screen using a circular or oval gesture of a user according to one embodiment of the present invention.

FIG. 5 is a flowchart illustrating a process of zooming out a screen using a circular or oval gesture of a user according to one embodiment of the present invention.

Referring to FIG. 5, the user determines a point he or she wants to zoom out in step 500. The electronic device performs a first semicircle or semi oval gesture counterclockwise in a separation distance corresponding to a zoom-out magnification from the center of the point the user wants to zoom out in step 502.

The electronic device senses the counterclockwise first semicircle or semi oval gesture of the user in step 504. The electronic device zooms out and displays a first screen in proportion to a radius of a counterclockwise semicircle or semi oval of the user in step 506. That is, the more the radius of the semicircle or semi oval is broadened, the more a zoom-out magnification is increased. On the other hand, the more the radius of the semicircle or semi oval is narrowed, the more a zoom-out magnification is decreased.

The electronic device determines whether the other second semicircle or semi oval gesture corresponding to the first semicircle or semi oval gesture is sensed counterclockwise in step 508. That is, the electronic device determines whether to zoom in or out the zoomed-out first screen additionally in proportion to a radius of the counterclockwise first semicircle or semi oval of the user (see, FIG. 9).

When the other second semicircle or semi oval gesture corresponding to the first semicircle or semi oval gesture is sensed counterclockwise, the electronic device proceeds to step 510 and zooms out and displays the zoomed-out first screen additionally according to an arc length of the other second semicircle or semi oval.

On the other hand, when the other second semicircle or semi oval gesture corresponding to the first semicircle or semi oval gesture is not sensed counterclockwise, that is, when another second semicircle or semi oval gesture is sensed clockwise, the electronic device proceeds to step 512 and zooms in and displays the zoomed-in first screen according to an arc length of the another second semicircle or semi oval.

The electronic device ends the algorithm of FIG. 5.

Figure 6A:
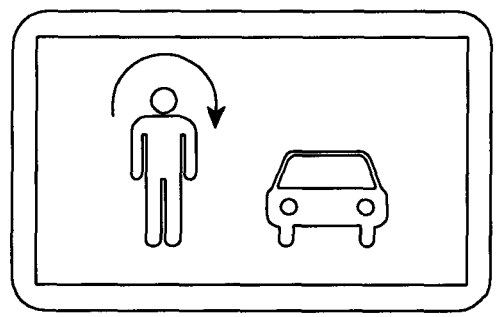
FIGS. 6A and 6B illustrate a process of zooming in a screen using a circular or oval gesture of a user according to one embodiment of the present invention.
Figure 6B:
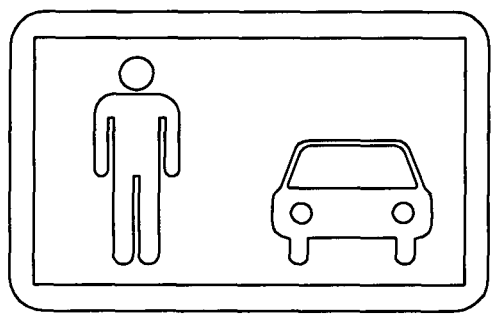

FIGS. 6A and 6B illustrate a process of zooming in a screen using a circular or oval gesture of a user according to one embodiment of the present invention.

Referring to FIG. 6A, when the user of an electronic device zooms in a face of an object who exist in an image, he or she performs a gesture corresponding to an operation drawing a clockwise concentric circle centering around a point he or she wants to zoom in. At this time, as shown in FIG. 6B, a screen is zoomed in and displayed. FIG. 6B shows an effect in which a screen is zoomed in centering around the face of the object by a certain magnification by the gesture of the clockwise concentric circle.

On the other hand, when the user moves his or her finger clockwise from an initial gesture time point by a concentric circle type, if his or her finger arrives at a point of a semicircle or semi oval type, a zoom-in effect is actually generated. In accordance with another embodiment of the present invention, a time point when the zoom-in effect is actually generated may be a time point when his or her finger arrives at a point of a circular or oval type which is broader or narrower than a half of a circular or oval type.

Also, because a zoom-in magnification of a time point when the finger of the user arrives at a semicircle or semi oval and an initial screen zoom-in effect is generated is proportional to a radius of the semicircle or semi oval and is proportional to a distance moved when the his or her gesture is held from the moment his or her finger passes an arc length of the semicircle or semi oval, it is increased in real time. A zoom-in magnification increased in comparison with a movement distance of an additional gesture may be increased linearly and may also be increased nonlinearly by a predetermined formula.

On the other hand, because a screen is zoomed in based on a center point of the semicircle or semi oval, the user of the electronic device determines a point he or she wants to zoom in, starts a gesture in a separation distance corresponding to a magnification at which he or she wants to zoom in the point from a corresponding point (center point of the point he or she wants to zoom in), and draws a concentric circle clockwise.

On the other hand, when the user wants to reduce a size magnification of an electronic document while passing an arc length of the semicircle or semi oval with his or her finger and moving his or her finger clockwise and additionally to increase the size magnification of the electronic document (an image, a webpage, etc.), if he or she moves his or her finger counterclockwise in a state where a gesture is held, a screen zoom-out effect may be obtained. This is because an internal processing device of the electronic device monitors a progress direction of a gesture continuously. A zoom-out rate when a screen is zoomed out may be reduced linearly in comparison with a distance where the finger of the user is moved counterclockwise to be similar to the above-described operation when the screen is zoomed in and be reduced nonlinearly by a predetermined formula.

Figure 7A:
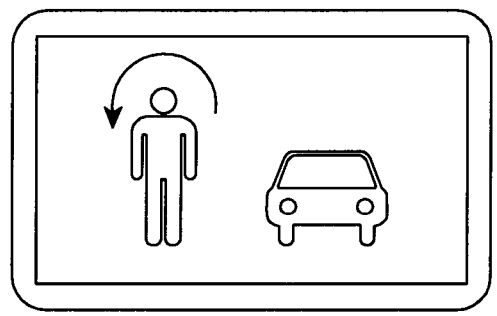
FIGS. 7A and 7B illustrate a process of zooming out a screen using a circular or oval gesture of a user according to one embodiment of the present invention.
Figure 7B:
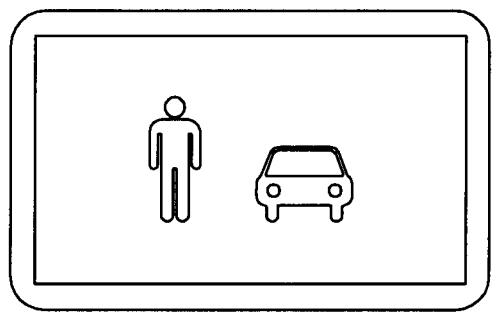

FIGS. 7A and 7B illustrate a process of zooming out a screen using a circular or oval gesture of a user according to one embodiment of the present invention.

Referring to FIG. 7A, when the user of an electronic device zooms out a face of an object who exist in an image, he or she performs a gesture corresponding to an operation drawing a counterclockwise concentric circle centering around a point he or she wants to zoom out. At this time, as shown in FIG. 7B, a screen is zoomed out and displayed. FIG. 7B shows an effect in which a screen is zoomed out centering around the face of the object by a certain magnification determined by the gesture of the clockwise concentric circle.

On the other hand, when a finger of the user arrives at a point of a semicircle or semi oval type counterclockwise gesture from an initial gesture time point by a concentric circle type gesture, a zoom-out effect is actually generated. In accordance with another embodiment of the present invention, a time point when the zoom-out effect is actually generated may be a time point when his or her finger arrives at a point of a circular or oval type gesture which is broader or narrower than a half of a circular or oval type.

Also, because a zoom-out magnification of a time point when the finger of the user arrives at a semicircle or semi oval and an initial screen zoom-out effect is generated is proportional to a radius of the semicircle or semi oval and is inversely proportional to a distance moved when his or her gesture is held from the moment his or her finger passes an arc length of the semicircle or semi oval, the zoom-out magnification is decreased in real time. A size magnification of an electronic document in comparison with a movement distance of an additional gesture may be decreased linearly and may also be decreased nonlinearly by a predetermined formula.

On the other hand, as described in FIG. 6A, when the user wants to increase a size magnification of an electronic document while passing an arc length of the semicircle or semi oval with his or her finger and moving his or her finger clockwise and additionally to decrease the size magnification of the electronic document (an image, a webpage, etc.), if he or she moves his or her finger clockwise in a state where a gesture is held, a screen zoom-in effect may be obtained. This is because an internal processing device of the electronic device monitors a progress direction of a gesture continuously. A zoom-in rate of an electronic document when a screen is zoomed in may be increased linearly in comparison with a distance where the finger of the user is moved clockwise to be similar to the above-described operation when the screen is zoomed out and be increased nonlinearly by a predetermined formula.

Figure 8:
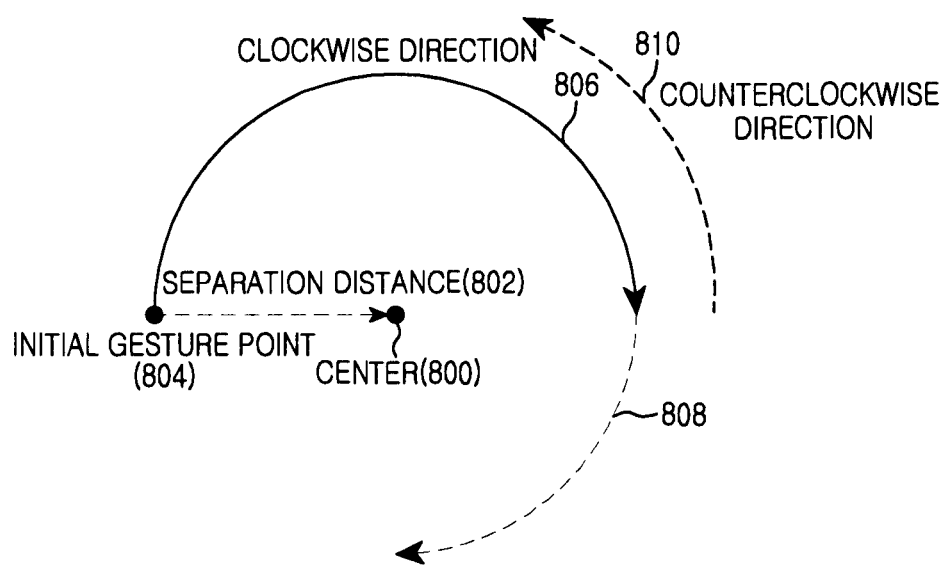
FIG. 8 illustrates a circular or oval gesture for controlling a screen zoom-in according to another embodiment of the present invention.

FIG. 8 illustrates a circular or oval gesture for controlling a screen zoom-in according to another embodiment of the present invention.

Referring to FIG. 8, when a user executes zoom-in of a screen, he or she zooms in the screen by determining an initial gesture point 804 of a separation distance 802 corresponding to a zoom-in magnification from the center 800 of a point he or she wants to zoom in and performing a gesture for drawing a semicircle or semi oval 806 clockwise with his or her finger on the initial gesture point 804. Thereafter, when the user wants to zoom in or out the zoomed-in screen additionally, he or she holds the gesture and moves his or her finger clockwise and continuously (808) or counterclockwise (810).

Figure 9:
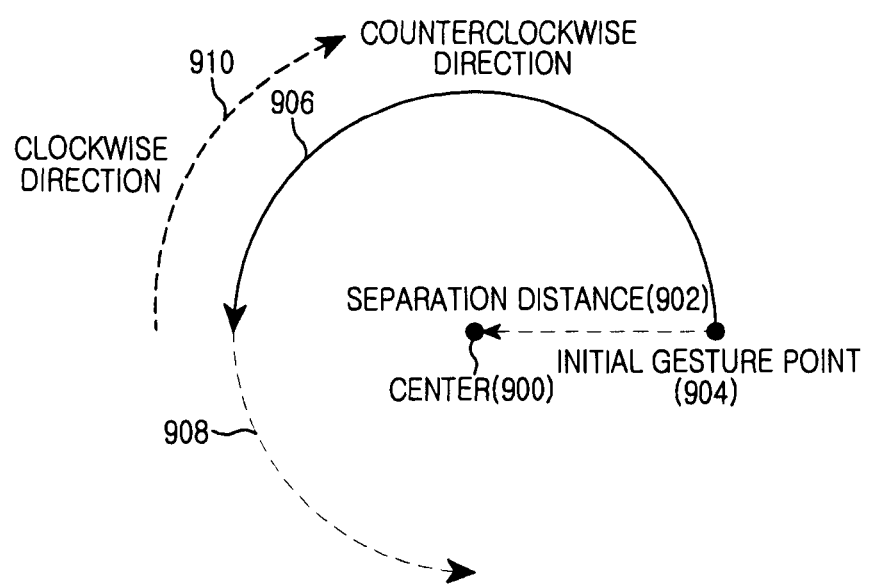
FIG. 9 illustrates a circular or oval gesture for controlling a screen zoom-out according to another embodiment of the present invention.

FIG. 9 illustrates a circular or oval gesture for controlling a screen zoom-out according to another embodiment of the present invention.

Referring to FIG. 9, when a user executes zoom-out of a screen, he or she zooms out the screen by determining an initial gesture point 904 of a separation distance 902 corresponding to a zoom-out magnification from the center 900 of a point he or she wants to zoom out and performing a gesture for drawing a semicircle or semi oval 906 counterclockwise with his or her finger on the initial gesture point 904. Thereafter, when the user wants to zoom in or out the zoomed-in screen additionally, he or she holds the gesture and moves his or her finger counterclockwise and continuously (908) or clockwise (910).

Figure 10A:
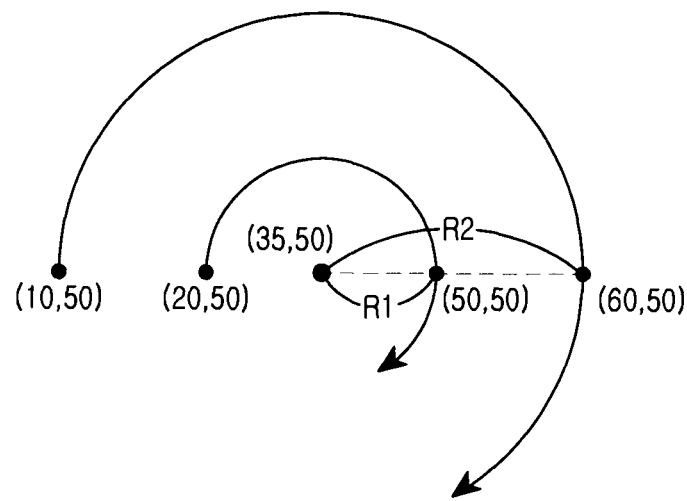
FIGS. 10A and 10B illustrate a process of moving a finger of a user on a touch screen clockwise or counterclockwise to zoom in or out a screen while having the center of the same concentric circle and changing a radius of the concentric circle according to one embodiment of the present invention.

FIG. 10A illustrate a process of moving a finger of a user on a touch screen clockwise to zoom in a screen while having the same concentric circle and changing a radius of the concentric circle according to one embodiment of the present invention.

Referring to FIG. 10A, for example, a first concentric circle having a radius R2 has an initial gesture coordinate (10, 50). While a user of an electronic device draws the first concentric circle with his or her finger, if his or her finger arrives at a gesture coordinate (60, 50), a central coordinate (35, 50) of the first concentric circle is determined. The electronic device zooms in a corresponding electronic document by a range corresponding to a value 25 of the radius R2 based on the corresponding coordinate. If the user performs a gesture operation additionally and continuously, the electronic device increases a size magnification of the electronic document by reflecting an additional gesture movement distance in real time. The electronic device may use a well-known heuristic algorithm to execute a scaling algorithm of the present invention only when the user moves his or her finger by a concentric circle or oval shape in a process of moving his or her finger from the gesture coordinate (10, 50) to the gesture coordinate (60, 50). That is, if a pattern in which the user starts an initial gesture and moves his or her finger during a certain time is determined as a linear motion, the electronic device performs not a scaling operation but a scrolling operation of the electronic document. On the other hand, a second concentric circle having a radius R1 has a gesture coordinate (20, 50). While the user draws the second concentric circle with his or her finger, if his or her finger arrives at a gesture coordinate (50, 50), a coordinate (35, 50) of the second concentric circle is obtained. The electronic device zooms in a corresponding electronic document by a range corresponding to a value 15 of the radius R1 based on the corresponding coordinate.

Also, the above-described method is performed when the user moves his or her finger counterclockwise and zooms out a screen as described in one embodiment of the present invention shown in FIG. 10A.

Figure 10B:
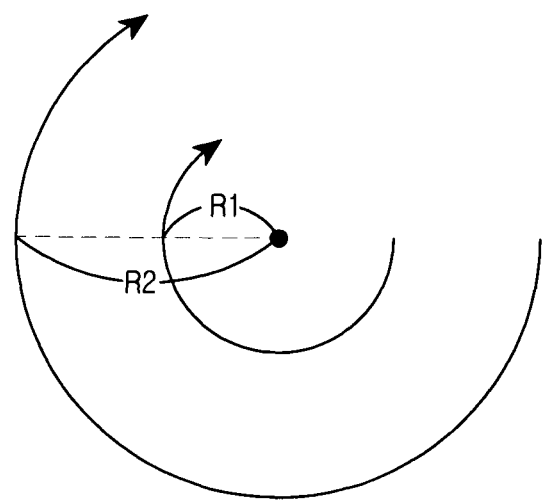

FIG. 10B illustrates a process of moving a finger of a user on a touch screen counterclockwise to zoom out a screen while having a concentric circle and changing a radius of the concentric circle according to one embodiment of the present invention.

Figures 11A, 11B:
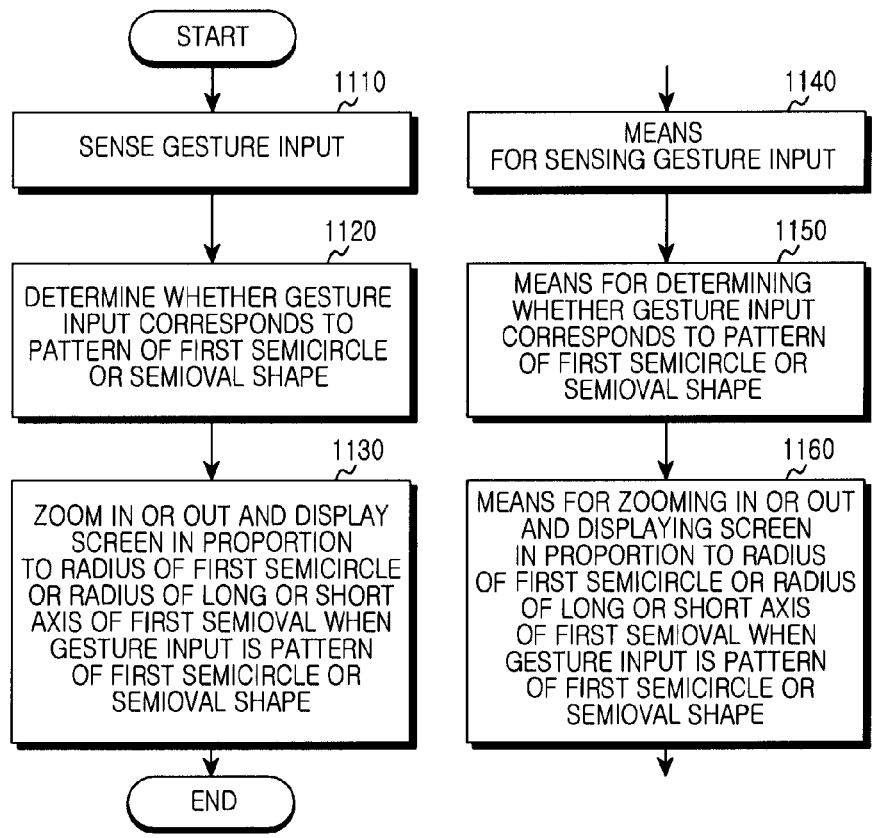
FIG. 11A is a flowchart illustrating a process of zooming in a screen using a circular or oval gesture by a screen display control method in an electronic device according to another embodiment of the present invention.
FIG. 11B is a block diagram illustrating a process of zooming in a screen using a circular or oval gesture by a screen display control method in an electronic device according to another embodiment of the present invention.

FIG. 11A is a flowchart illustrating a process of zooming in a screen using a circular or oval gesture by a screen display control method in an electronic device according to another embodiment of the present invention.

First of all, a gesture input sensing process of sensing whether a gesture is input on the electronic device is performed (step 1110). Herein, the gesture means that a pattern of a certain shape is formed by touching a touch screen of the electronic device with external input such as a finger or stylus pen of a user and dragging the finger or the stylus pen along the touch screen in a state where the touch is held on the touch screen. The sensing of the touch of the touch screen is performed by a touch recognition method described in one embodiment of the present invention or other well-known methods.

The electronic device determines whether the gesture corresponds to a semicircle or semi oval shape pattern (step 1120). Herein, a certain gesture is actually performed by touching a touch screen and tracing along the touch screen in a semicircle or semi oval shape, the gesture includes the certain gesture. If a radius of a long axis of a certain semi oval may be recognized although a shape of a semi oval is slightly distorted, the certain semi oval is regarded as a semicircle.

When the gesture is a pattern of the semicircle or semi oval shape, the electronic device performs a process of zooming in or out and displaying a screen in proportion to a radius of a semicircle or a radius of a long or short axis of a semi oval (step 1130). Herein, to zoom in or out the screen in proportion to the radius of the semicircle or the radius of the long or short axis of the semi oval is to change a rate of a screen zoom-in or zoom-out in proportion to a radius. That is, when the radius of the semicircle or the radius of the long or short axis of the semi oval is broadened, it is meant that the rate of the screen zoom-in or zoom-out is increased. Herein, a size of the radius of the semicircle or the radius of the long or short axis of the semi oval and the rate of the screen zoom-in or zoom-out corresponding to the radius of the semicircle or the radius of the long or short axis of the semi oval may be preset.

On the other hand, when the radius of the semicircle or the radius of the long or short axis of the semi oval is narrowed, the rate of the screen zoom-in or zoom-out may be increased. Herein, the size of the radius of the semicircle or the radius of the long or short axis of the semi oval and the corresponding rate of the screen zoom-in or zoom-out may be preset.

Also, herein, when the gesture is input in a first direction, the screen is zoomed in. When the gesture is input in a second direction, the screen is zoomed out.

FIG. 11B is a block diagram illustrating a process of zooming in a screen using a circular or oval gesture by a screen display control method in an electronic device according to another embodiment of the present invention.

First of all, a gesture input sensing means 1140 performs a process of sensing whether a gesture is input on the electronic device. Herein, the gesture means that a pattern of a certain shape is formed by touching a touch screen of the electronic device with external input such as a finger or stylus pen of a user and dragging the finger or stylus pen across the touch screen in a state where the touch is held. The gesture input sensing means 1140 senses the touch of the touch screen by a touch recognition method described in one embodiment of the present invention or other well-known methods.

A gesture shape determining means 1150 determines whether the input gesture corresponds to a particular pattern of a semicircle or semi oval shape. Herein, a certain gesture is actually performed by a semicircle or semi oval shape, and therefore, the gesture includes the certain gesture. If a radius of a long axis of a certain semi oval may be recognized although a shape of a semi oval is slightly distorted, the certain semi oval is regarded as a semicircle.

When the gesture is the pattern of the semicircle or semi oval shape a display performing means 1160 performs a process of zooming in or out and displaying the screen on the touch screen in proportion to a radius of a semicircle or a radius of a long or short axis of a semi oval. Herein, the display performing means 1160 may be the controller 200 of FIG. 2 or the application processor 202 of the controller 200. Herein, to zoom in or out the screen in proportion to the radius of the semicircle or the radius of the long or short axis of the semi oval is to change a rate of a screen zoom-in or zoom-out in proportion to a radius. That is, when the radius of the semicircle or the radius of the long or short axis of the semi oval is broadened, it is meant that the rate of the screen zoom-in or zoom-out is increased. Herein, a size of the radius of the semicircle or the radius of the long or short axis of the semi oval and the corresponding rate of the screen zoom-in or zoom-out may be preset.

On the other hand, when the radius of the semicircle or the radius of the long or short axis of the semi oval is narrowed, the display performing means 1160 may increase the rate of the screen zoom-in or zoom-out. Herein, the size of the radius of the semicircle or the radius of the long or short axis of the semi oval and the corresponding rate of the screen zoom-in or zoom-out may be preset.

Also, herein, when the gesture is input in a first direction, the display performing means 1160 zooms in the screen. When the gesture is input in a second direction, the display performing means 1160 zoomed out the screen.

As shown in FIGS. 2 to 11, the description was given whereby a screen is zoomed in when a gesture is performed clockwise and whereby the screen is zoomed out when the gesture is performed counterclockwise. However, it is also contemplated that in various embodiments, when a gesture is performed counterclockwise, a screen is zoomed in. When the gesture is performed clockwise, the screen is zoomed out.

Also, the screen may be zoomed in or out in proportion to a radius of a semicircle or semi oval. However, the screen may be zoomed in or out in proportion to a diameter of a semicircle or semi oval.

Figure 12:
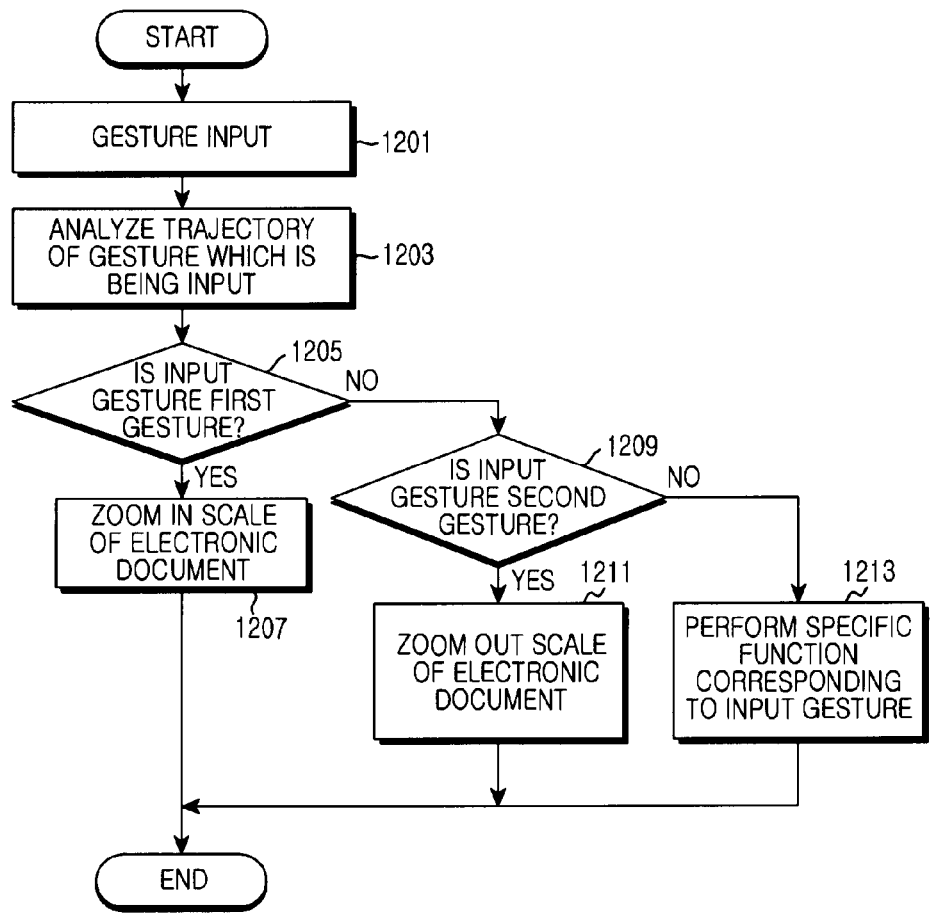
FIG. 12 is a rough flowchart illustrating a process of scaling an electronic document in a portable terminal according to one embodiment of the present invention.

FIG. 12 is a rough flowchart illustrating a process of scaling an electronic document in a portable terminal according to one embodiment of the present invention.

Referring to FIG. 12, in step 1201, an electronic device outputs an electronic document through the touch screen, receives a single touch gesture from a user through the touch screen, and proceeds to step 1203. Herein, the single touch gesture means a gesture implemented by one finger or stylus pen of the user.

In step 1203, the electronic device analyzes a trajectory of the single touch gesture which is being input. In step 1205, the electronic device verifies whether the input single touch gesture is a first gesture based on the analyzed result. Herein, the first gesture means a gesture, which is preset, for requesting the zoom-in of the output electronic document. As a result of the verification, when the input single touch gesture is the first gesture, the electronic device proceeds to step 1207. When the input single touch gesture is not the first gesture, the electronic device proceeds to step 1209.

In step 1207, the electronic device zooms in the output electronic document. On the other hand, in step 1209, the electronic device verifies whether the input single touch gesture is a second gesture. Herein, the second gesture means a gesture, which is preset, for requesting the zoom-out of the output electronic document. As a result of the verification, when the input single touch gesture is the second gesture, the electronic device proceeds to step 1211. When the input single touch gesture is not the second gesture, the electronic device proceeds to step 1213.

In step 1211, the electronic device zooms out the output electronic document. On the other hand, in step 1213, the electronic device performs a specific function corresponding to the input single touch gesture. Herein, the specific function may be a scroll function. For example, when the output electronic document is an image, the scroll function means a function for outputting a next image or next portion of the output image. When the output electronic document is an e-book, the scroll function means a function for outputting a next page of the output page. When the output electronic document is a webpage, the scroll function means a function for outputting a subsequent or the other WebPages except for an output webpage among a sequence of WebPages making up a particular web site.

The first gesture means a gesture which progresses in a predetermined first direction and then processes a predetermined second direction. The second gesture, as a gesture which progresses in a direction opposite to that of the first gesture, means a gesture which progresses in the second direction and then progresses in the first direction. For one example, when the first gesture is a gesture which progresses in an upward direction and then progresses a downward direction by a finger or stylus pen of the user on a screen of the portable terminal, the second gesture may be a gesture which progresses in the downward direction and then progresses in the upward direction. For another example, when the first gesture is a gesture which progresses in a left direction and then progresses a right direction by a finger or stylus pen of the user on the screen of the portable terminal, the second gesture may be a gesture which progresses in the right direction and then progresses in the left direction. For another example, when the first gesture is a gesture which progresses in a direction of 135 degrees from a horizontal line and then progresses a direction of 315 degrees from the horizontal line by the finger or stylus pen of the user on the screen of the portable terminal, the second gesture may be a gesture which progresses in the direction of 315 degrees from the horizontal line and then progresses in the direction of 135 degrees from the horizontal line.

Figure 13A:
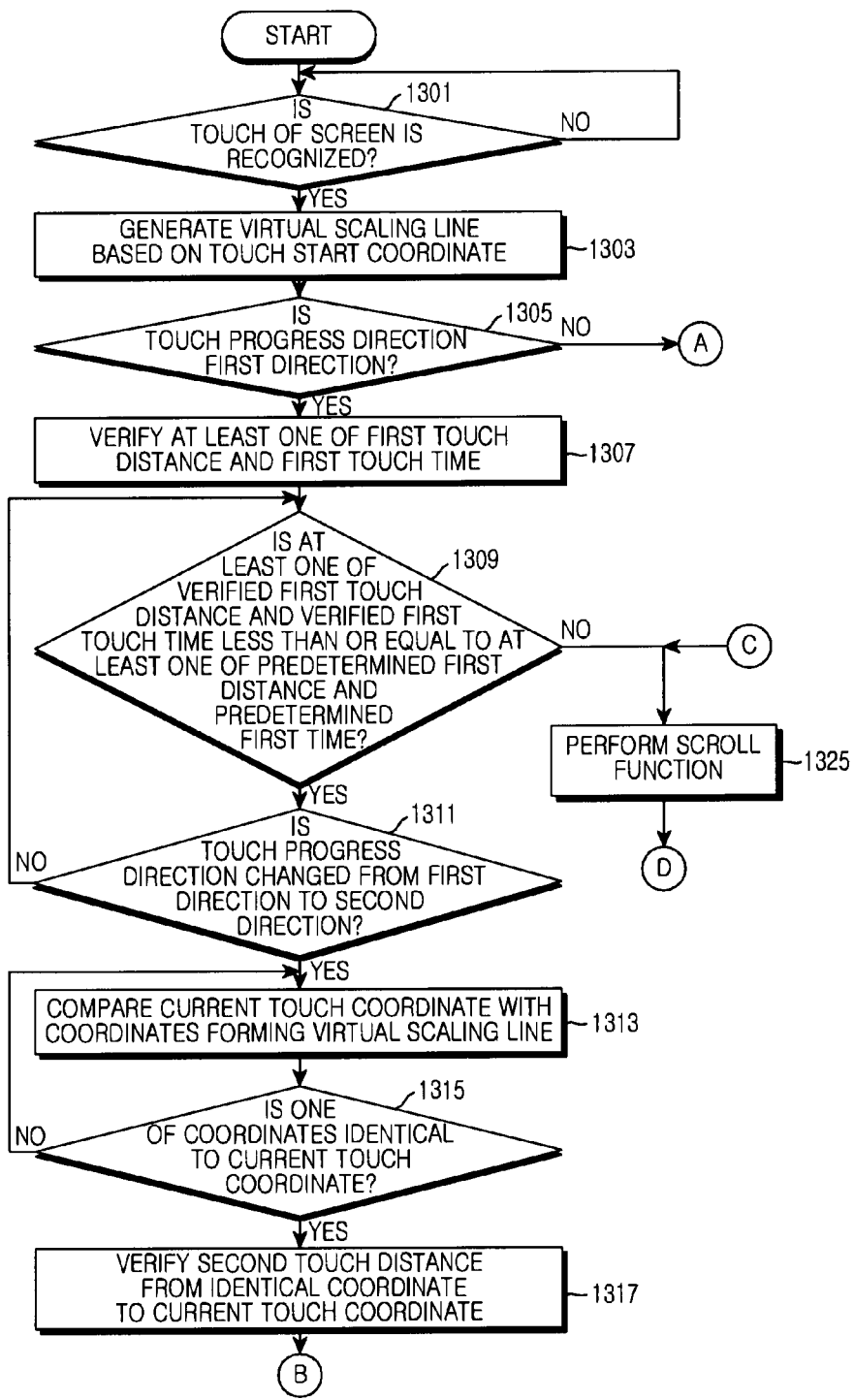
FIGS. 13A, 13B and 13C are detailed flowcharts illustrating in more detail a process of scaling an electronic document in a portable terminal according to one embodiment of the present invention as depicted in FIG. 12.
Figure 13B:
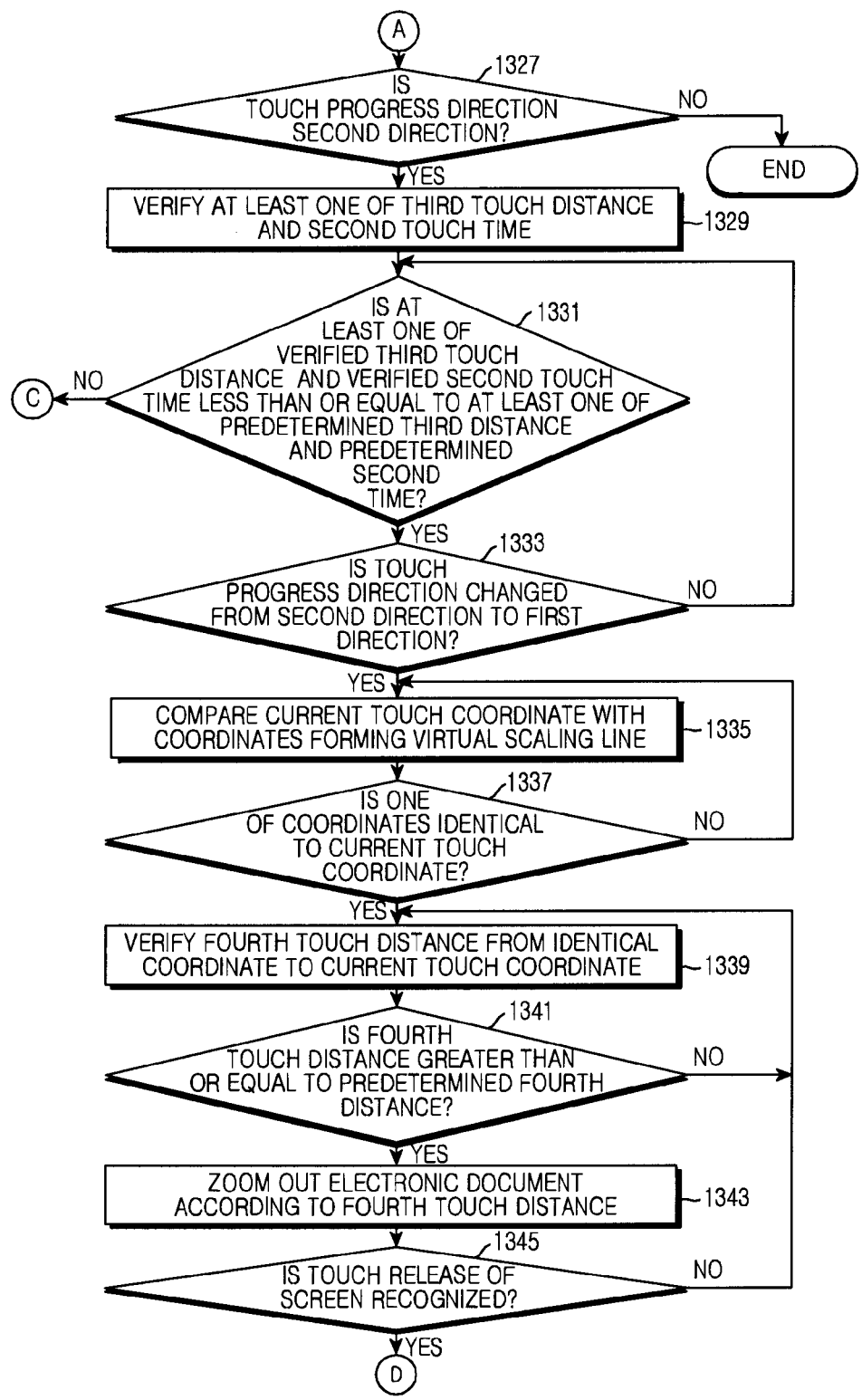
Figure 13C:
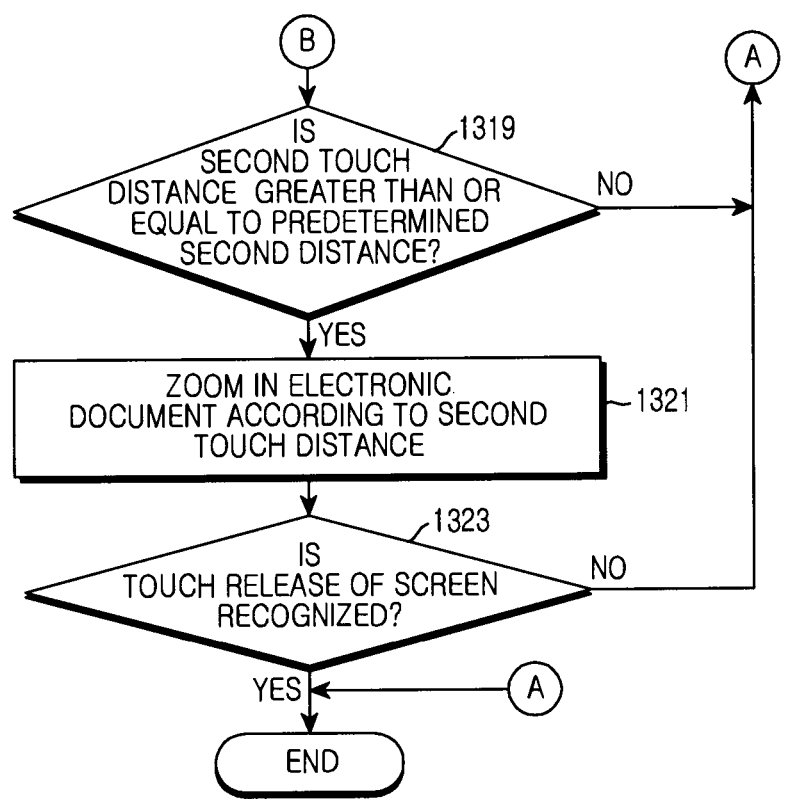

FIGS. 13A to 13C are detailed flowcharts illustrating a process of scaling an electronic document in a portable terminal according to one embodiment of the present invention.

Referring to FIGS. 13A to 13C, in step 1301, after the electronic document is output through a touch screen, an electronic device recognizes whether a screen is touched by a user. If the touch of the screen is recognized, the electronic device proceeds to step 1303. If the touch of the screen is not recognized, the electronic device repeats the processing from step 1301.

In step 1303, the electronic device verifies a coordinate on a screen according to the touch until the touch is released, generates a virtual scaling line based on a touch start coordinate, and proceeds to step 1305. Herein, the electronic device may display a coordinate within an x and y coordinate system.

Herein, the touch start coordinate means an initial coordinate on a screen, on which the touch is started. The scaling line means a line virtually generated for scaling (zooming in or out) the electronic document. For one example, when the first gesture and the second gesture are gestures using an upward direction and a downward direction, the scaling line may be a horizontal line including the touch start coordinate. For another example, when the first gesture and the second gesture are gestures using a left direction and a right direction, the scaling line may be a vertical line including the touch start coordinate. For another example, when the first gesture and the second gesture are gestures using a direction of 135 degrees from a horizontal line and a direction of 315 degrees from the horizontal line, the scaling line may be a diagonal line including the touch start coordinate.

In step 1305, the electronic device verifies whether a touch progress direction is a first direction. Herein, the first direction means a predetermined specific direction. For example, the first direction may be an upward direction, a downward direction, a left direction, a right direction, a direction of 133 degrees from a horizontal line, or a direction of 325 degrees from a horizontal line. The touch progress direction means a direction in which a finger or stylus pen of the user progresses while the finger or stylus pen is touched. As a result of the verification, when the touch progress direction is the first direction, the electronic device proceeds step 1307. When the touch progress direction is not the first direction, the electronic device proceeds step 1327.

In step 1307, the electronic device verifies at least one of a first touch distance and a first touch time and proceeds to step 1309. Herein, the first touch distance means a distance from a touch start coordinate to a current touch coordinate for a touch which progresses in the first direction. The first touch time means a time from a touch start time point to a current touch time point for the touch which progresses in the first direction.

In step 1309, the electronic device verifies whether any one of the verified first touch distance and the verified first touch time is less than or equal to at least one of a predetermined first distance and a predetermined first time. As a result of the verification, when the any one of the verified first touch distance and the verified first touch time is less than or equal to at least the one of the predetermined first distance and the predetermined first time, the electronic device proceeds to step 1311. When the any one of the verified first touch distance and the verified first touch time exceeds at least one of the predetermined first distance and the predetermined first time, the electronic device proceeds to step 1325.

In step 1325, the electronic device performs a scroll function.

On the other hand, in step 1311, the electronic device verifies whether a touch progress direction is changed from the first direction to a second direction. Herein, the second direction means a direction opposite to the first direction. For one example, when the first direction is an upward direction, the second direction may be a downward direction. For another example, when the first direction is a left direction, the second direction may be a right direction. For another example, when the first direction is a direction of 135 degrees from a horizontal line, the second direction may be a direction of 315 degrees from the horizontal line. As a result of the verification, when the touch progress direction is changed to the second direction, the electronic device proceeds to step 1313. When the touch progress direction is not changed to the second direction, the electronic device proceeds to step 1309.

In step 1313, the electronic device compares a coordinate (hereinafter, referred to as a current touch coordinate) of a point of a current touch which is progressing in the second direction with a plurality of coordinates forming a virtual scaling line and proceeds to step 1315. In step 1315, the electronic device verifies whether any one of a plurality of coordinates is identical to the current touch coordinate. As a result of the verification, when the any one of a plurality of coordinates is identical to the current touch coordinate, the electronic device proceeds to step 1317. When the any one of a plurality of coordinates is not identical to the current touch coordinate, the electronic device proceeds to step 1313. That is, the electronic device verifies whether a gesture passes the virtual scaling line through steps 1315 and 1317.

In step 1317, the electronic device verifies a second touch distance indicating a distance from the identical coordinate to the current touch coordinate and proceeds to step 1319. In step 1319, the electronic device verifies whether the second touch distance is greater than or equal to a predetermined second distance. As a result of the verification, when the second touch distance is greater than or equal to the predetermined second distance, the electronic device proceeds to step 1321. When the second touch distance is less than the predetermined second distance, the electronic device proceeds to step 1327.

In step 1321, the electronic device zooms in the electronic document according to the second touch distance and proceeds to step 1323. Herein, the electronic device determines a zoom-in magnification according to the second touch distance and zooms in the electronic document at the zoom-in magnification determined based on a touch start coordinate of the electronic document.

In step 1323, the electronic device verifies whether touch release of a screen is recognized. As a result of the verification, if the touch release is recognized, the electronic device ends the scaling operation of the electronic document. If the touch release is not recognized, the electronic device proceeds to step 1327.

In step 1327, the electronic device verifies whether the touch progress direction is the second direction. As a result of the verification, when the touch progress direction is the second direction, the electronic device proceeds to step 1329. When the touch progress direction is not the second direction, the electronic device ends the scaling operation of the electronic document.

In step 1329, the electronic device verifies at least one of a third touch distance and a second touch time and proceeds to step 1331. Herein, the third touch distance means a distance from a touch start coordinate to the current touch coordinate for a touch which progresses in the second direction. The second touch time means a time from a touch start time point to a current touch time point for a touch which progresses in the second direction.

In step 1331, the electronic device verifies whether at least any one of the verified third touch distance and the verified second touch time is less than or equal to at least any one of a predetermined third distance and a predetermined second time. As a result of the verification, when at least the any one of the verified third touch distance and the verified second touch time is less than or equal to at least the any one of the predetermined third distance and the predetermined second time, the electronic device proceeds to step 1333. When at least the any one of the verified third touch distance and the verified second touch time exceeds at least the any one of the predetermined third distance and the predetermined second time, the electronic device proceeds to step 1325.

In step 1325, the electronic device performs the scroll function.

On the other hand, in step 1333, the electronic device verifies whether a touch progress direction is changed from the second direction to the first direction. As a result of the verification, when the touch progress direction is changed to the first direction, the electronic device proceeds to step 1335. When the touch progress direction is not changed to the first direction, the electronic device proceeds to step 1331.

In step 1335, the electronic device compares a current touch coordinate which is progressing in the first direction with a plurality of coordinates forming a virtual scaling line and proceeds to step 1337. In step 1337, the electronic device verifies whether any one of the plurality of coordinates is identical to the current touch coordinate. As a result of the verification, when the any one of the plurality of coordinates is identical to the current touch coordinate, the electronic device proceeds to step 1339. When the any one of the plurality of coordinates is not identical to the current touch coordinate, the electronic device proceeds to step 1335. That is, the electronic device verifies whether a gesture passes a virtual scaling line through steps 1337 and 1339.

In step 1339, the electronic device verifies a fourth touch distance indicating a distance from the identical coordinate to the current touch coordinate and proceeds to step 1341. In step 1341, the electronic device verifies whether the fourth touch distance is greater than or equal to a predetermined fourth distance. As a result of the verification, when the fourth touch distance is greater than or equal to the fourth distance, the electronic device proceeds to step 1343. When the fourth touch distance is less than the fourth distance, the electronic device proceeds to step 1339.

In step 1343, the electronic device zooms out the electronic document according to the fourth touch distance and proceeds to step 1345. Herein, the electronic device determines a zoom-out magnification according to the fourth touch distance and zooms out the electronic document at a zoom-out magnification determined based on a touch start coordinate of the electronic device.

In step 1345, the electronic device verifies whether a touch release of the screen is recognized. As a result of the verification, when the touch release of the screen is recognized, the electronic device ends the scaling operation of the electronic document. When the touch release of the screen is not recognized, the electronic device proceeds to step 1339.

Figure 14A:
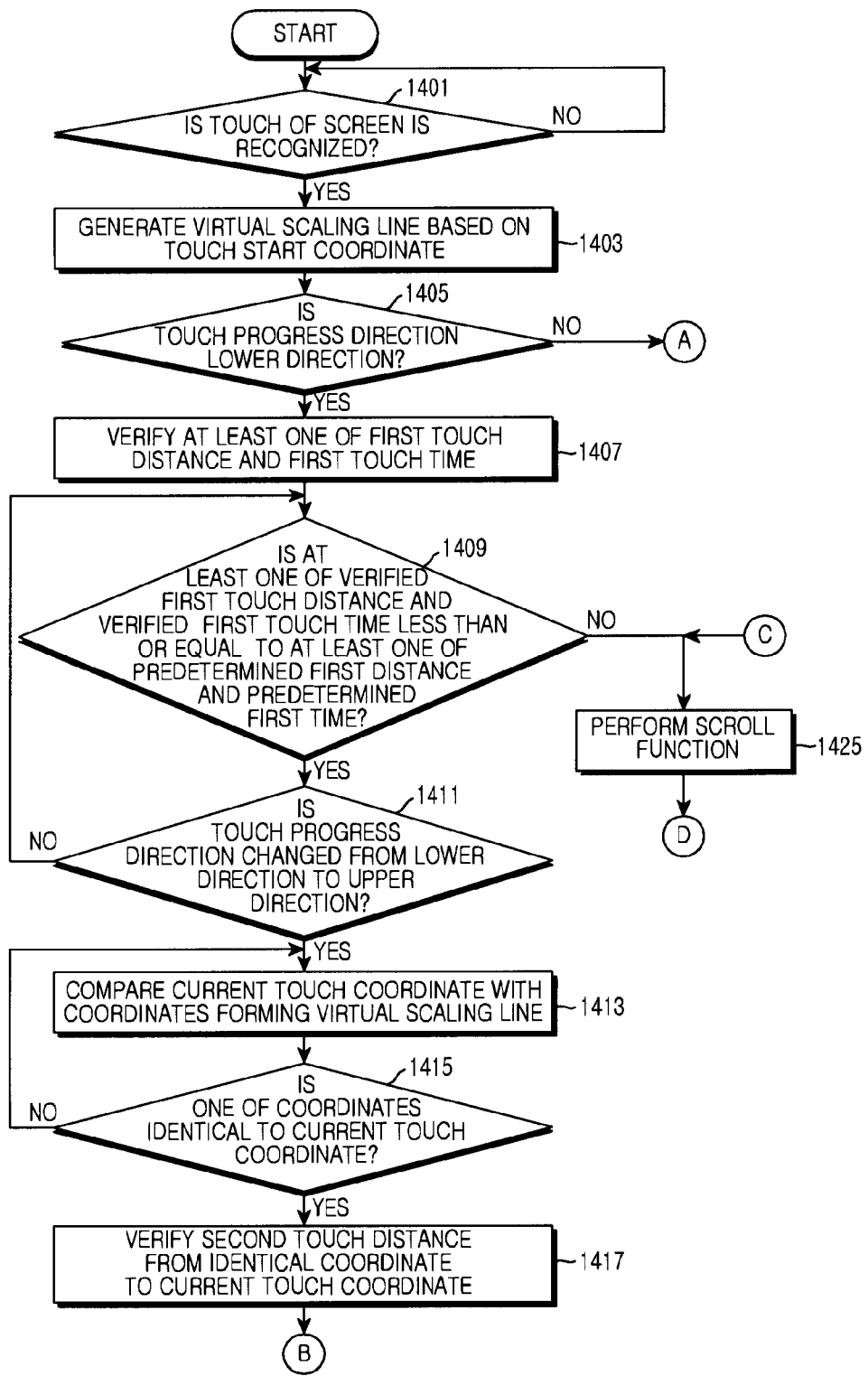
FIGS. 14A, 14B and 14C are detailed flowcharts illustrating a process of scaling an electronic document in a portable terminal according to another embodiment of the present invention.
Figure 14B:
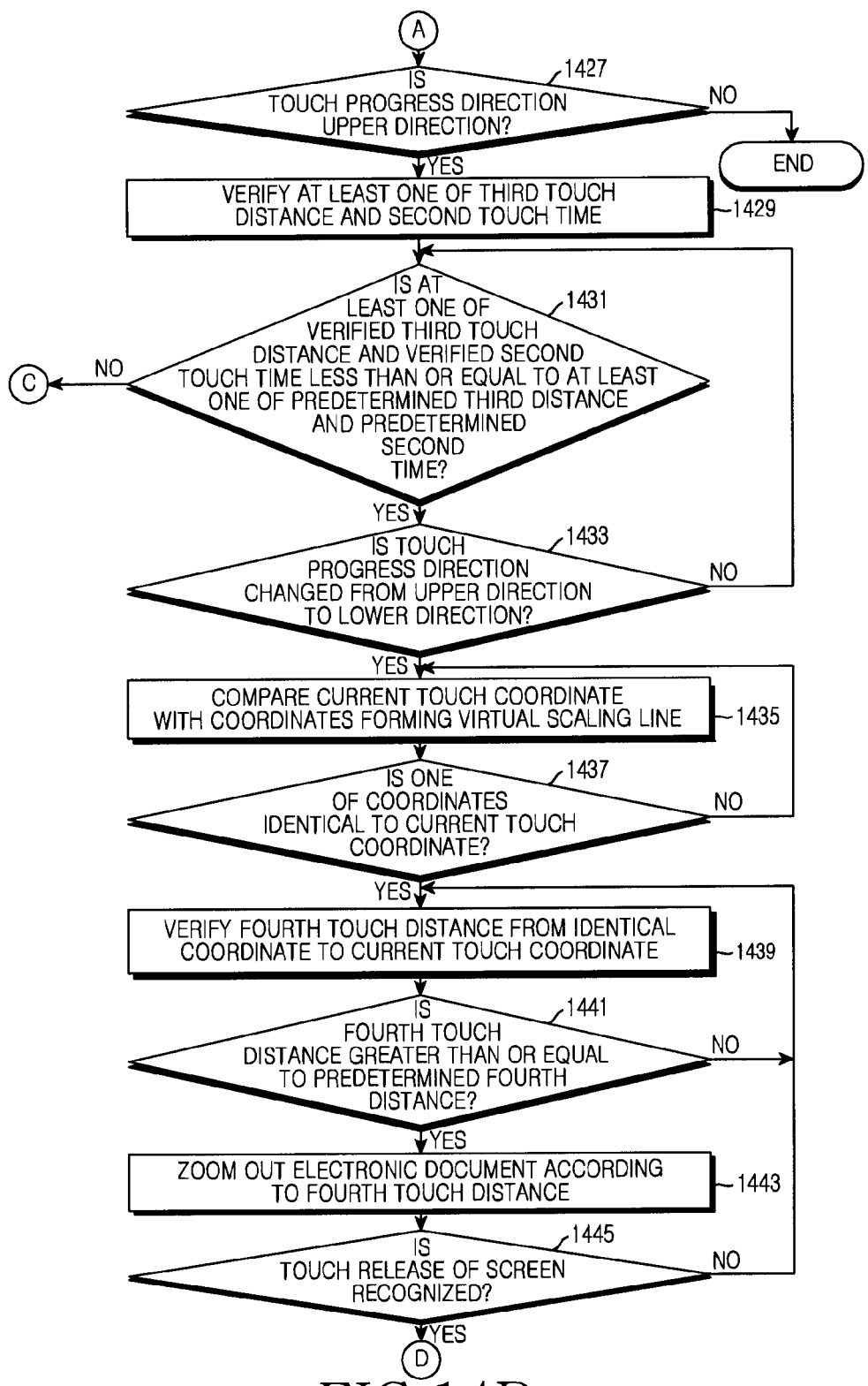
Figure 14C:
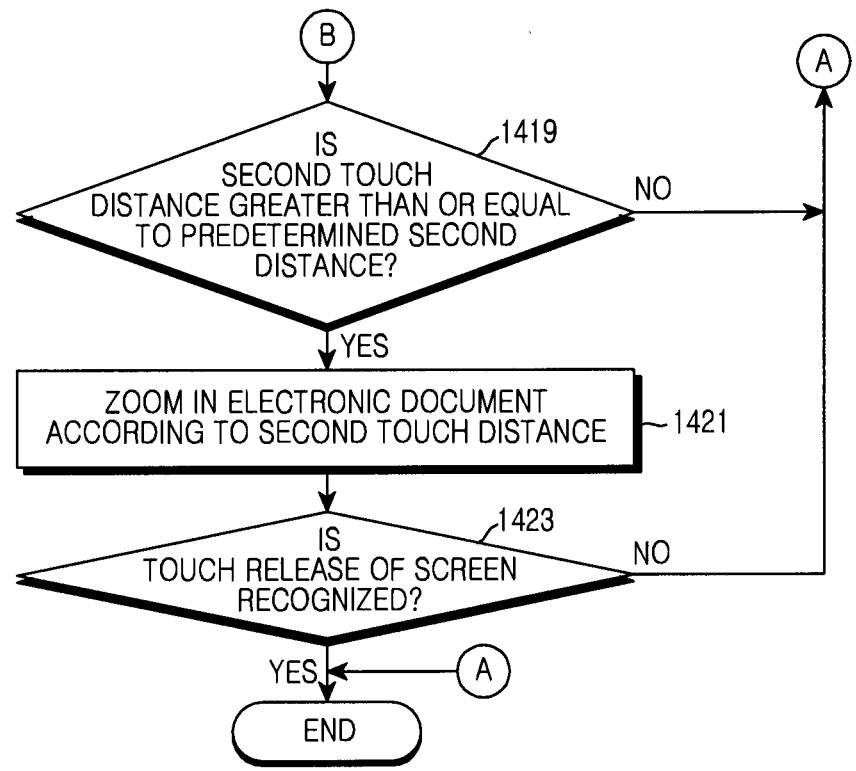

FIGS. 14A to 14C are detailed flowcharts illustrating a process of scaling an electronic document in a portable terminal according to another embodiment of the present invention.

In describing FIGS. 14A to 14C, it is assumed that a first direction is a downward direction and a second direction is an upward direction. It is assumed that a first gesture is a gesture which progresses in the downward direction and then progresses in the upward direction and a second gesture is a gesture which progresses in the upward direction and then progresses in the downward direction.

Referring to FIGS. 14A to 14C, in step 1401, after the electronic document is output through a touch screen, an electronic device recognizes whether a screen is touched by a user. If the touch of the screen is recognized, the electronic device proceeds to step 1403. If the touch of the screen is not recognized, the electronic device repeats the processing from step 1401.

In step 1403, the electronic device verifies a coordinate on a screen according to the touch until the touch is released, generates a virtual scaling line based on a touch start coordinate, and proceeds to step 1405. Herein, the electronic device may display a coordinate within an x and y coordinate system.

Herein, the touch start coordinate means an initial coordinate on a screen, on which the touch is started. The scaling line means a line virtually generated for scaling (zooming in or out) the electronic document. For one example, when the first gesture and the second gesture are gestures using the upward direction and the downward direction, the scaling line may be a horizontal line including the touch start coordinate.

In step 1405, the electronic device verifies whether a touch progress direction is the downward direction. Herein, the touch progress direction means a direction in which a finger or stylus pen of the user progresses while the finger or stylus pen is touched to the touch screen. As a result of the verification, when the touch progress direction is the downward direction, the electronic device proceeds step 1407. When the touch progress direction is not the downward direction, the electronic device proceeds step 1427.

In step 1407, the electronic device verifies at least one of a first touch distance and a first touch time and proceeds to step 1409. Herein, the first touch distance means a distance from a touch start coordinate to a current touch coordinate for a touch which progresses in the upward direction. The first touch time means a time from a touch start time point to a current touch time point for the touch which progresses in the upward direction.

In step 1409, the electronic device verifies whether any one of the verified first touch distance and the verified first touch time is less than or equal to at least one of a predetermined first distance and a predetermined first time. As a result of the verification, when the any one of the verified first touch distance and the verified first touch time is less than or equal to at least one of the predetermined first distance and the predetermined first time, the electronic device proceeds to step 1411. When the any one of the verified first touch distance and the verified first touch time exceeds at least one of the predetermined first distance and the predetermined first time, the electronic device proceeds to step 1425.

In step 1425, the electronic device performs a scroll function.

On the other hand, in step 1411, the electronic device verifies whether a touch progress direction is changed from the downward direction to the upward direction. As a result of the verification, when the touch progress direction is changed to the upward direction, the electronic device proceeds to step 1413. When the touch progress direction is not changed to the upward direction, the electronic device proceeds to step 1409.

In step 1413, the electronic device compares a coordinate (hereinafter, referred to as a current touch coordinate) of a point of a touch which is progressing in the upward direction with a plurality of coordinates forming a virtual scaling line and proceeds to step 1415. In step 1415, the electronic device verifies whether any one of a plurality of coordinates is identical to the current touch coordinate. As a result of the verification, when the any one of a plurality of coordinates is identical to the current touch coordinate, the electronic device proceeds to step 1417. When the any one of a plurality of coordinates is not identical to the current touch coordinate, the electronic device proceeds to step 1413.

In step 1417, the electronic device verifies a second touch distance indicating a distance from the identical coordinate to the current touch coordinate and proceeds to step 1419. In step 1419, the electronic device verifies whether the second touch distance is greater than or equal to a predetermined second distance. As a result of the verification, when the second touch distance is greater than or equal to the predetermined second distance, the electronic device proceeds to step 1421. When the second touch distance is less than the predetermined second distance, the electronic device proceeds to step 1427.

In step 1421, the electronic device zooms in the electronic document according to the second touch distance. Herein, the electronic device determines a zoom-in magnification according to the second touch distance and zooms in the electronic document at the zoom-in magnification determined based on a touch start coordinate of the electronic document.

In step 1423, the electronic device verifies whether touch release of a screen is recognized. As a result of the verification, if the touch release is recognized, the electronic device ends the scaling operation of the electronic document. If the touch release is not recognized, the electronic device proceeds to step 1427.

In step 1427, the electronic device verifies whether the touch progress direction is the upward direction. As a result of the verification, when the touch progress direction is the upward direction, the electronic device proceeds to step 1429. When the touch progress direction is not the upward direction, the electronic device ends the scaling operation of the electronic document.

In step 1429, the electronic device verifies at least one of a third touch time and a second touch time and proceeds to step 1431. Herein, the third touch distance means a distance from a touch start coordinate to the current touch coordinate for a touch which progresses in the second direction. The second touch time means a time from a touch start time point to a current touch time point for a touch which progresses in the second direction.

In step 1431, the electronic device verifies whether at least any one of the verified third touch distance and the verified second touch time is less than or equal to at least any one of a predetermined third distance and a predetermined second time. As a result of the verification, when at least the any one of the verified third touch distance and the verified second touch time is less than or equal to at least the any one of the predetermined third distance and the predetermined second time, the electronic device proceeds to step 1433. When at least the any one of the verified third touch distance and the verified second touch time exceeds at least the any one of the predetermined third distance and the predetermined second time, the electronic device proceeds to step 1425.

In step 1425, the electronic device performs the scroll function.

On the other hand, in step 1433, the electronic device verifies whether a touch progress direction is changed from the upward direction to the downward direction. As a result of the verification, when the touch progress direction is changed to the downward direction, the electronic device proceeds to step 1435. When the touch progress direction is not changed to the downward direction, the electronic device proceeds to step 1431.

In step 1435, the electronic device compares a current touch coordinate which is progressing in the downward direction with a plurality of coordinates forming a virtual scaling line and proceeds to step 1437. In step 1437, the electronic device verifies whether any one of the plurality of coordinates is identical to the current touch coordinate. As a result of the verification, when the any one of the plurality of coordinates is identical to the current touch coordinate, the electronic device proceeds to step 1439. When the any one of the plurality of coordinates is not identical to the current touch coordinate, the electronic device proceeds to step 1435.

In step 1439, the electronic device verifies a fourth touch distance indicating a distance from the identical coordinate to the current touch coordinate and proceeds to step 1441. In step 1441, the electronic device verifies whether the fourth touch distance is greater than or equal to a predetermined fourth distance. As a result of the verification, when the fourth touch distance is greater than or equal to the fourth distance, the electronic device proceeds to step 1443. When the fourth touch distance is less than the fourth distance, the electronic device proceeds to step 1439.

In step 1443, the electronic device zooms out the electronic document according to the fourth touch distance and proceeds step 1445. Herein, the electronic device determines a zoom-out magnification according to the fourth touch distance and zooms out the electronic document at a zoom-out magnification determined based on a touch start coordinate of the electronic device.

In step 1445, the electronic device verifies whether touch release of the screen is recognized. As a result of the verification, when the touch release of the screen is recognized, the electronic device ends the scaling operation of the electronic document. When the touch release of the screen is not recognized, the electronic device proceeds to step 1439.

Figure 23:
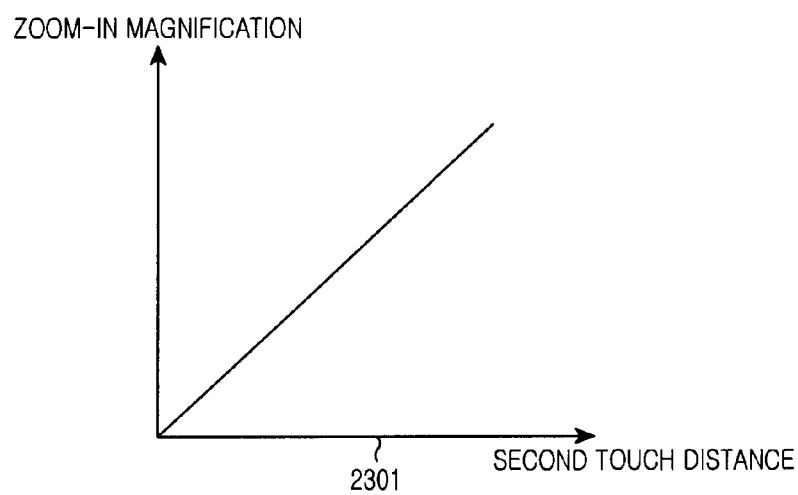
FIG. 23 is a graph diagram illustrating relation between a second touch distance and a zoom-in magnification according to one embodiment of the present invention.
Figure 23:
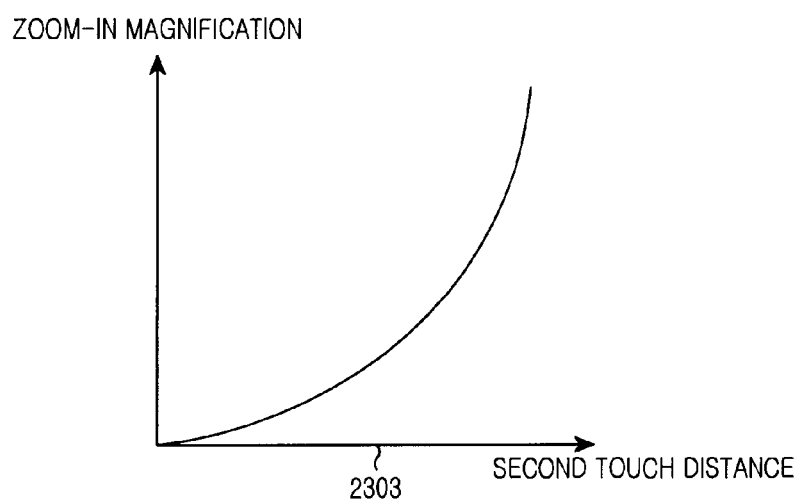

FIG. 23 is a graph diagram illustrating the relationship between a second touch distance and a zoom-in magnification according to one embodiment of the present invention.

Referring to FIG. 23, as shown in a graph 2301, a zoom-in magnification may be determined to be proportional to a second touch distance. Or, as shown in a graph 2303, a zoom-in magnification may be determined to be proportional to an exponential function of the second touch distance for example (y=ex wherein y is a zoom-out magnification, and x is a second touch distance).

A zoom-out magnification may be also determined to be proportional to a fourth touch distance or an exponential function of the fourth touch distance.

Figure 15:
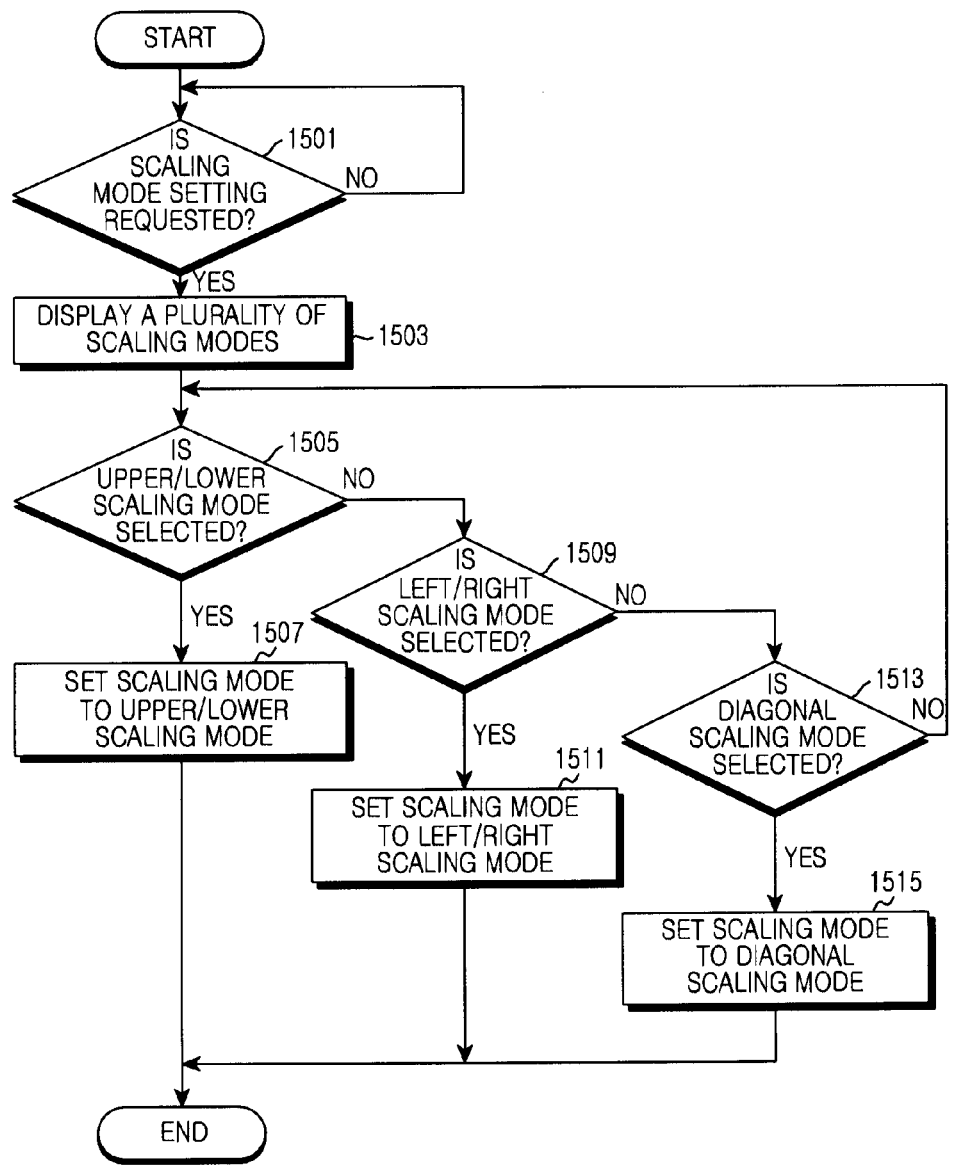
FIG. 15 is a flowchart illustrating a process of setting a scaling mode according to one embodiment of the present invention.

FIG. 15 is a flowchart illustrating a process of setting a scaling mode according to one embodiment of the present invention.

Referring to FIG. 15, in step 1501, an electronic device verifies whether scaling mode setting is requested by a user. As a result of the verification, if the scaling mode setting is requested, the electronic device proceeds to step 1503. If the scaling mode setting is not requested, the electronic device repeats the processing from step 1501. In step 1503, the electronic device displays a plurality of scaling modes and proceeds to step 1505. For example, the plurality of scaling modes may include an upward/downward scaling mode, a left/right scaling mode, and a diagonal scaling mode.

Herein, the upward/downward scaling mode means a mode for scaling an electronic document using a first gesture which progresses in an upward direction and then progress in a downward direction and a second gesture which progresses in the downward direction and then progresses in the upward direction. The left/right scaling mode means a mode for scaling the electronic document using a first gesture which progresses in a left direction and then progress in a right direction and a second gesture which progresses in the right direction and then progresses in the left direction. The diagonal scaling mode means a mode for scaling the electronic document using a first gesture which progresses in a direction of 135 degrees from a horizontal line and then progress in a direction of 315 degrees from the horizontal line and a second gesture which progresses in a direction of 315 degrees from a horizontal line and then progress in a direction of 135 degrees from the horizontal line.

In step 1505, the electronic device verifies whether the upward/downward scaling mode is selected by the user. As a result of the verification, if the upward/downward scaling mode is selected, the electronic device proceeds to step 1507. If the upward/downward scaling mode is not selected, the electronic device proceeds to step 1509. In step 1507, the electronic device sets a scaling mode to the upward/downward scaling mode.

On the other hand, in step 1509, the electronic device verifies whether the left/right scaling mode is selected by the user. As a result of the verification, if the left/right scaling mode is selected, the electronic device proceeds to step 1511. If the left/right scaling mode is not selected, the electronic device proceeds to step 1513. In step 1511, the electronic device sets the scaling mode to the left/right scaling mode.

On the other hand, in step 1513, the electronic device verifies whether the diagonal scaling mode is selected by the user. As a result of the verification, if the diagonal scaling mode is selected, the electronic device proceeds to step 1515. If the diagonal scaling mode is not selected, the electronic device proceeds to step 1505. In step 1515, the electronic device sets the scaling mode to the diagonal scaling mode.

Figure 16:
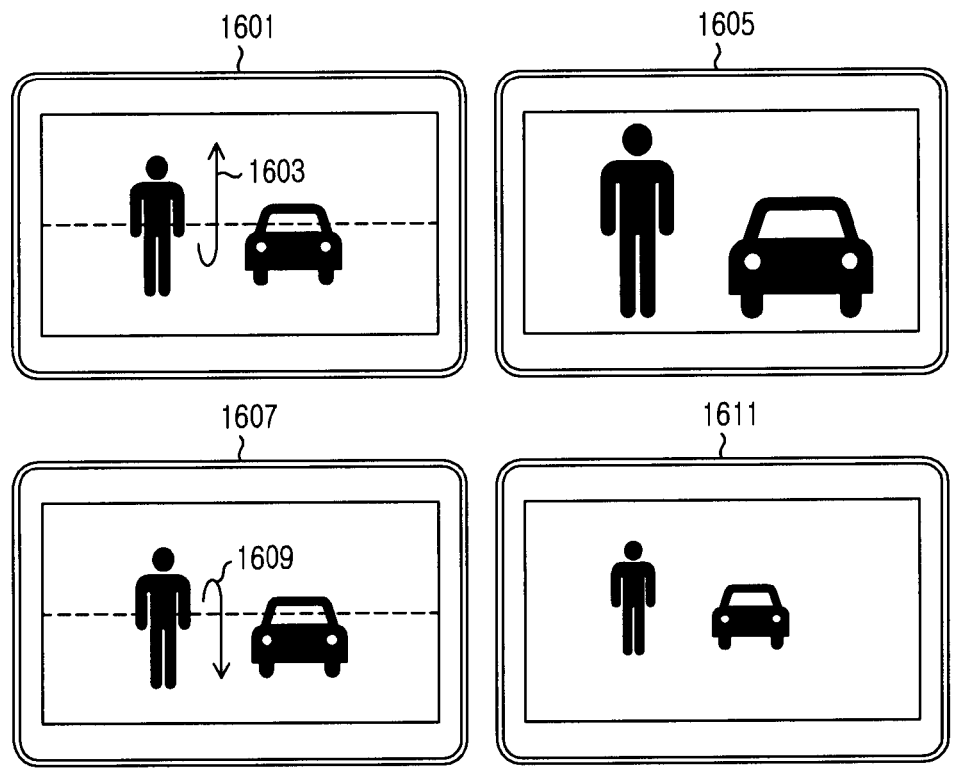
FIG. 16 illustrates screens for scaling an electronic document according to one embodiment of the present invention.

FIG. 16 illustrates screens for scaling an electronic document according to one embodiment of the present invention.

In describing FIG. 16, in one embodiment of the present invention, it is assumed that a first gesture, as a gesture for zooming in an electronic document, is a gesture which progresses in a downward direction and then processes in an upward direction on a screen. It is assumed that a second gesture, as a gesture for zooming out the electronic document, is a gesture which progresses in the upward direction and then processes in the downward direction on the screen.

Referring to FIG. 16, on a screen 1601, if a first gesture 1603 is input by a user, as shown in a screen 1605, an electronic device zooms in the electronic document. On a screen 1607, if a second gesture 1609 is input by the user, as shown in a screen 1611, the electronic device zooms out the electronic document.

Figure 17:
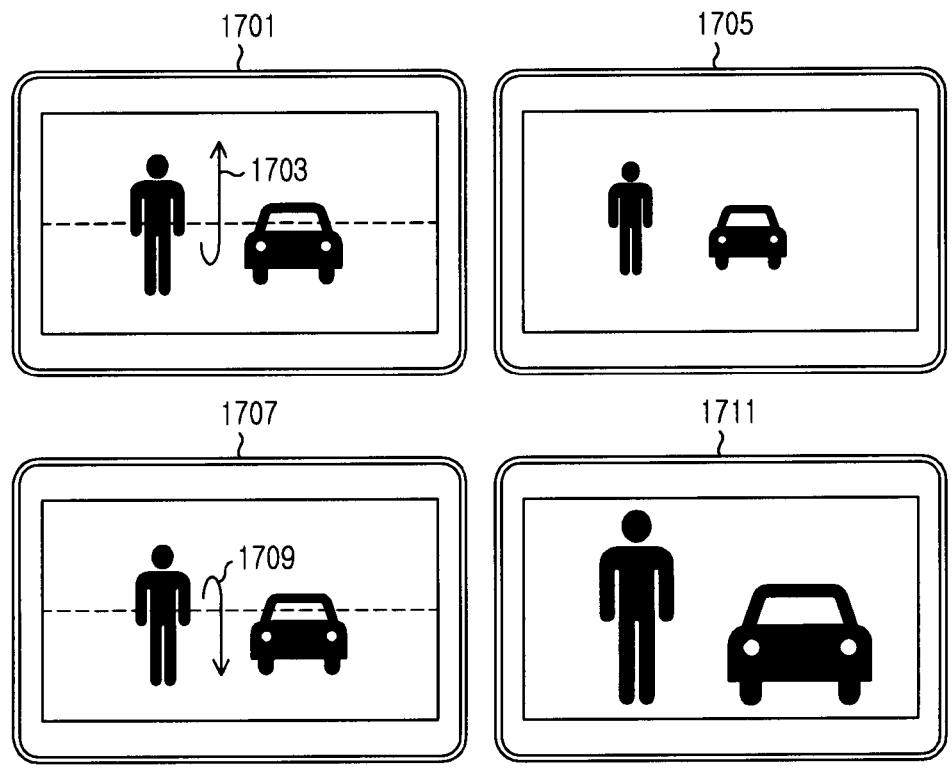
FIG. 17 illustrates screens for scaling an electronic document according to another embodiment of the present invention.

FIG. 17 illustrates screens for scaling an electronic document according to another embodiment of the present invention.

In describing FIG. 17, in another embodiment of the present invention, it is assumed that a first gesture, as a gesture for zooming in an electronic document, is a gesture which progresses in an upward direction and then processes in a downward direction on a screen. It is assumed that a second gesture, as a gesture for zooming out the electronic document, is a gesture which progresses in the downward direction and then processes in the upward direction on the screen.

Referring to FIG. 17, on a screen 1701, if a second gesture 1703 is input by a user, as shown in a screen 1705, an electronic device zooms out the electronic document. On a screen 1707, if a first gesture 1709 is input by the user, as shown in a screen 1711, the electronic device zooms in the electronic document.

Figure 18:
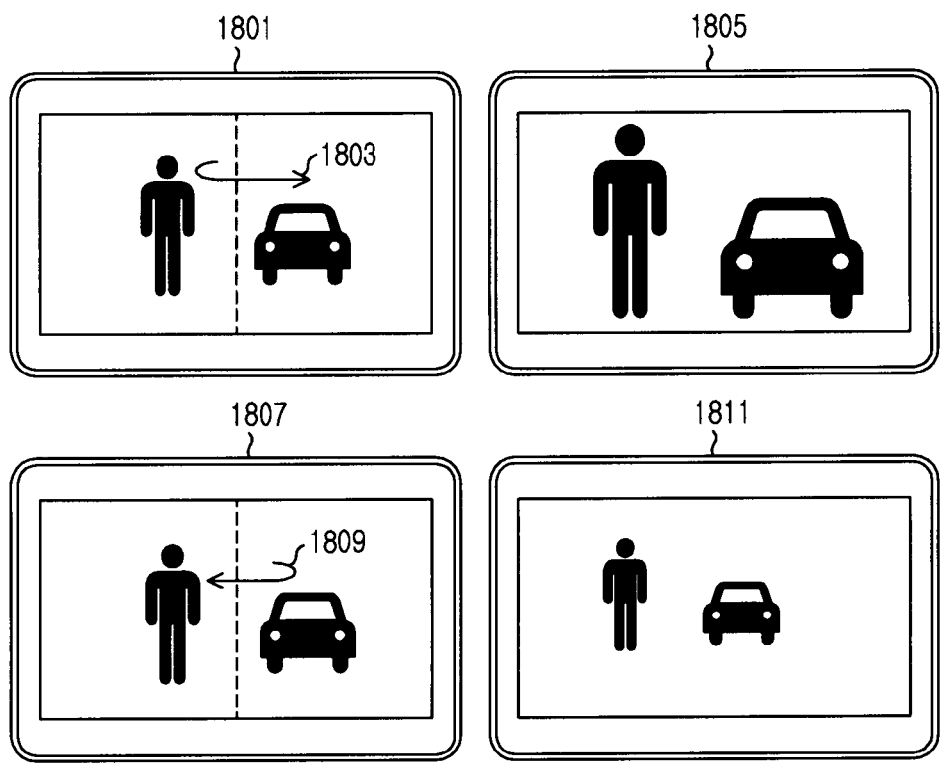
FIG. 18 illustrates screens for scaling an electronic document according to another embodiment of the present invention.

FIG. 18 illustrates screens for scaling an electronic document according to another embodiment of the present invention.

In describing FIG. 18, in another embodiment of the present invention, it is assumed that a first gesture, as a gesture for zooming in an electronic document, is a gesture which progresses in a left direction and then processes in a right direction on a screen. It is assumed that a second gesture, as a gesture for zooming out the electronic document, is a gesture which progresses in the right direction and then processes in the left direction on the screen.

Referring to FIG. 18, on a screen 1801, if a first gesture 1803 is input by a user, as shown in a screen 1805, an electronic device zooms in the electronic document. On a screen 1807, if a second gesture 1809 is input by the user, as shown out screen 1811, the electronic device zooms out the electronic document.

Figure 19:
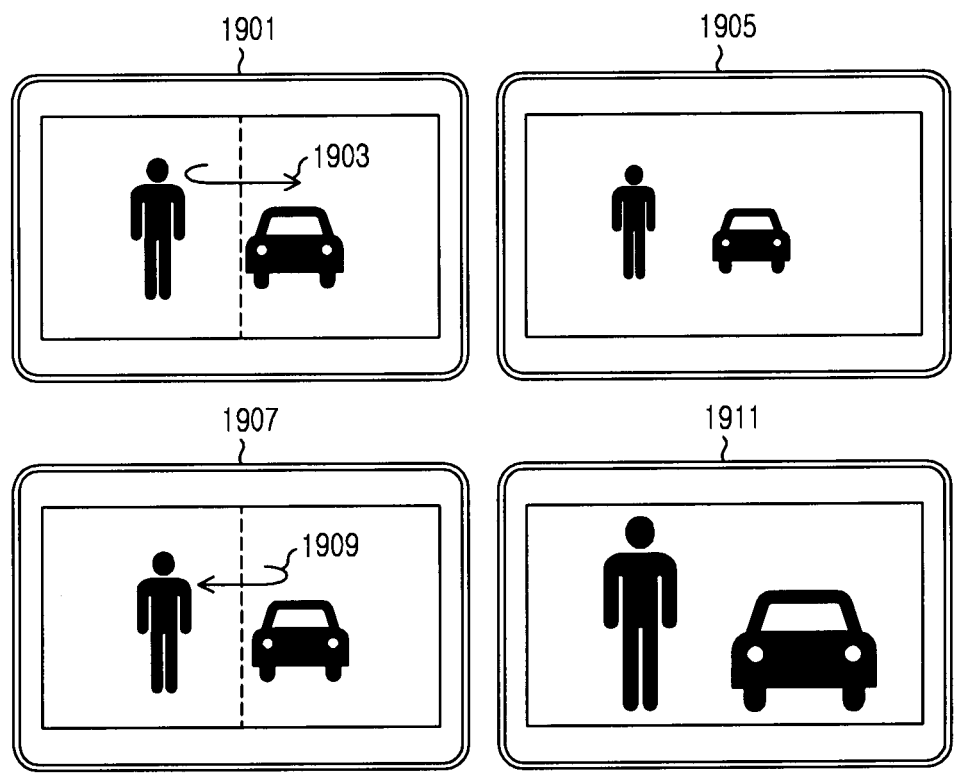
FIG. 19 illustrates screens for scaling an electronic document according to another embodiment of the present invention.

FIG. 19 illustrates screens for scaling an electronic document according to another embodiment of the present invention.

In describing FIG. 19, in another embodiment of the present invention, it is assumed that a first gesture, as a gesture for zooming in an electronic document, is a gesture which progresses in a right direction and then processes in a left direction on a screen. It is assumed that a second gesture, as a gesture for zooming out the electronic document, is a gesture which progresses in the left direction and then processes in the right direction on the screen.

Referring to FIG. 19, on a screen 1901, if a second gesture 1903 is input by a user, as shown in a screen 1905, an electronic device zooms out the electronic document. On a screen

1907, if a first gesture 1909 is input by the user, as shown out screen 1911, the electronic device zooms in the electronic document.

Figure 20:
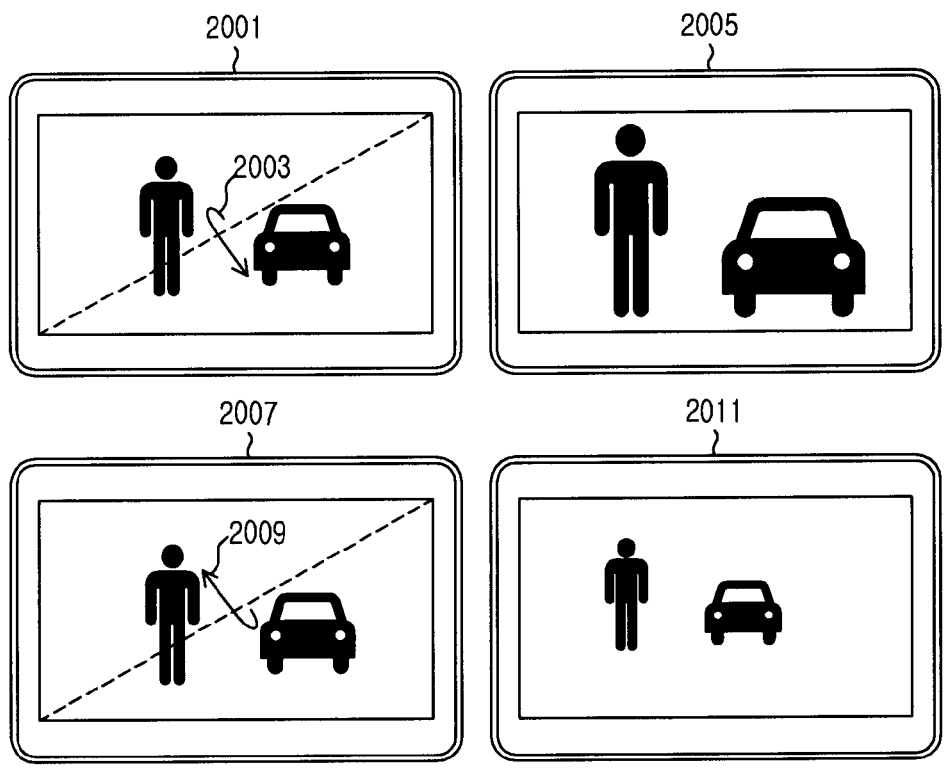
FIG. 20 illustrates screens for scaling an electronic document according to another embodiment of the present invention.

FIG. 20 illustrates screens for scaling an electronic document according to another embodiment of the present invention.

In describing FIG. 20, in another embodiment of the present invention, it is assumed that a first gesture, as a gesture for zooming in an electronic document, is a gesture which progresses in a direction of 135 degrees from a horizontal line and then processes in a direction of 315 degrees from the horizontal line on a screen. It is assumed that a second gesture, as a gesture for zooming out the electronic document, is a gesture which progresses in the direction of 315 degrees from the horizontal line and then processes in the direction of 135 degrees from the horizontal line on the screen.

Referring to FIG. 20, on a screen 2001, if a first gesture 2003 is input by a user, as shown in a screen 2005, an electronic device zooms in the electronic document. On a screen 2007, if a second gesture 2009 is input by the user, as shown out screen 2011, the electronic device zooms out the electronic document.

Figure 21:
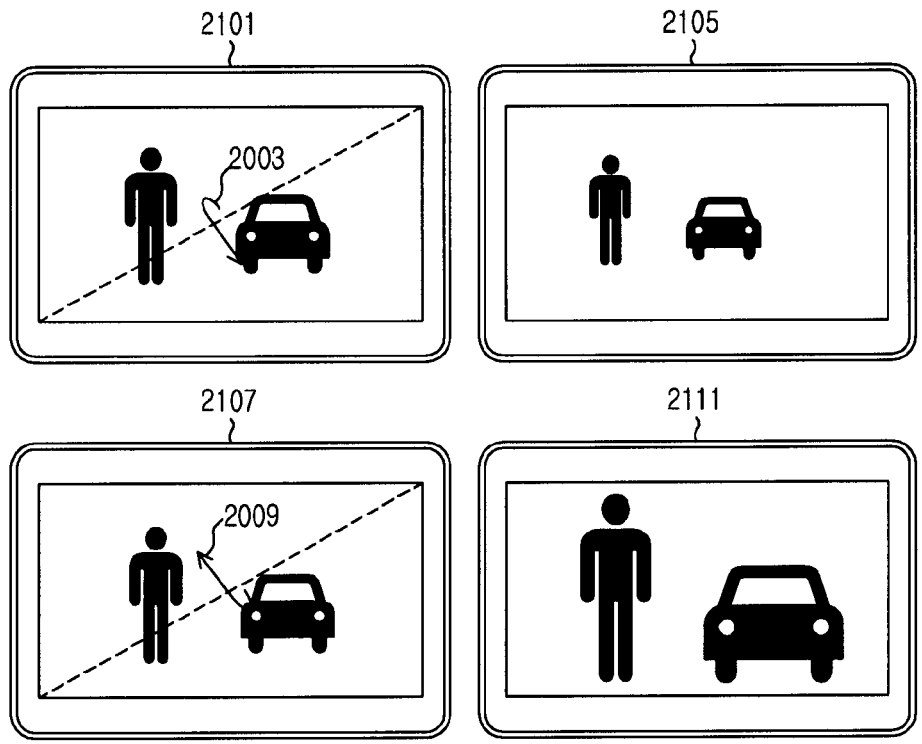
FIG. 21 illustrates screens for scaling an electronic document according to another embodiment of the present invention.

FIG. 21 illustrates screens for scaling an electronic document according to another embodiment of the present invention.

In describing FIG. 21, in another embodiment of the present invention, it is assumed that a first gesture, as a gesture for zooming in an electronic document, is a gesture which progresses in a direction of 315 degrees from a horizontal line and then processes in a direction of 135 degrees from the horizontal line on a screen. It is assumed that a second gesture, as a gesture for zooming out the electronic document, is a gesture which progresses in the direction of 135 degrees from the horizontal line and then processes in the direction of 315 degrees from the horizontal line on the screen.

Referring to FIG. 21, on a screen 2101, if a second gesture 2103 is input by a user, as shown in a screen 2105, an electronic device zooms out the electronic document. On a screen 2107, if a first gesture 2109 is input by the user, as shown out screen 2111, the electronic device zooms in the electronic document.

Figure 22:
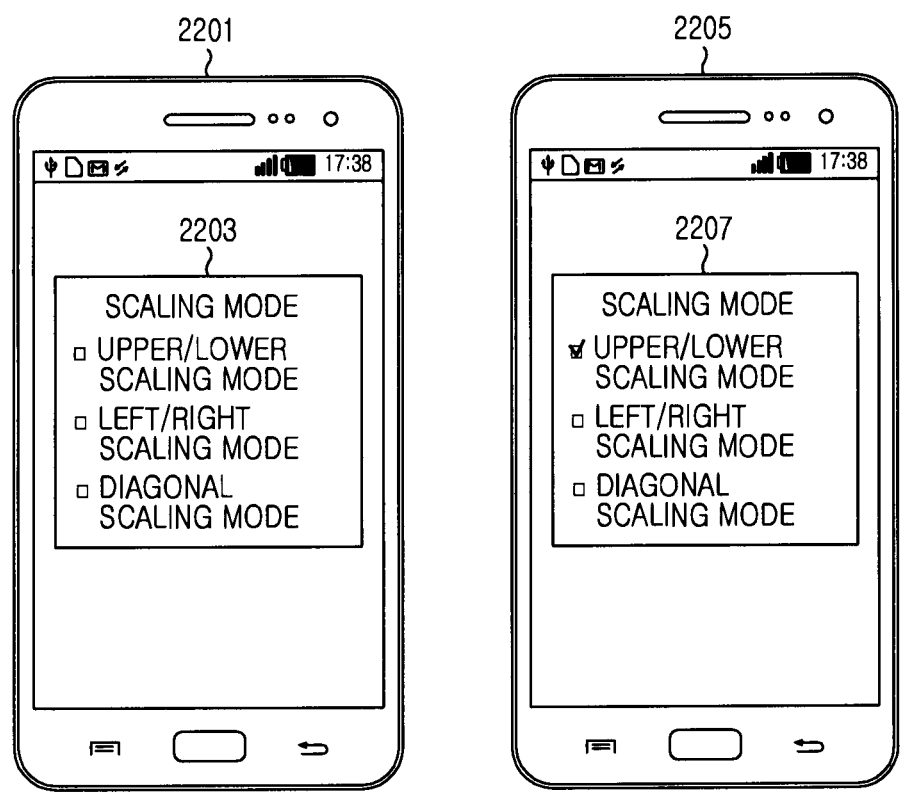
FIG. 22 illustrates a process of setting a scaling mode according to one embodiment of the present invention.

FIG. 22 illustrates a process of setting a scaling mode according to one embodiment of the present invention.

Referring to FIG. 22, if the scaling mode setting is requested by a user, as shown in a screen 2201, the electronic device outputs a plurality of scaling modes 2203. Herein, the plurality of scaling modes may include an upward/downward scaling mode, a left/right scaling mode, and a diagonal scaling mode.

Herein, the upward/downward scaling mode means a mode for scaling an electronic document using a first gesture which progresses in an upward direction and then progress in a downward direction and a second gesture which progresses in the downward direction and then progresses in the upward direction. The left/right scaling mode means a mode for scaling the electronic document using a first gesture which progresses in a left direction and then progress in a right direction and a second gesture which progresses in the right direction and then progresses in the left direction. The diagonal scaling mode means a mode for scaling the electronic document using a first gesture which progresses in a direction of 135 degrees from a horizontal line and then progress in a direction of 315 degrees from the horizontal line and a second gesture which progresses in a direction of 315 degrees from a horizontal line and then progress in a direction of 135 degrees from the horizontal line.

If the upward/downward scaling mode is selected among the plurality of output scaling modes by the user (2207), the electronic device may set a scaling mode to the upward/downward scaling mode.

Also, method according to claims and/or embodiments described in the specification may be implemented as hardware, software, or combinational type of the hardware and the software.

When the method is implemented by the software, a computer-readable storage medium for storing one or more programs (software modules) may be provided. The one or more programs stored in the computer-readable storage medium are configured for being executed by one or more processors in the portable electronic device 100. The one or more programs include instructions for allowing the portable electronic device 100 to execute the methods according to the claims of the present invention and/or the embodiments described in the specification herein below.

These programs (software module, software) may be stored in a RAM, a non-volatile memory including a flash memory, a ROM, an EEPROM, a magnetic disc storage device, a CD-ROM, a DVD or an optical storage device of a different type, and a magnetic cassette. Or, the programs may be stored in a memory configured by combination of some or all of them. Also, the configured memory may include a plurality of memories.

Also, the programs may be stored in an attachable storage device capable of accessing an electronic device through each of communication networks such as the Internet, an intranet, a Local Area Network (LAN), a Wide LAN (WLAN), and a Storage Area Network (SAN) or a communication network configured by combination of them. This storage device may connect to the electronic device through an external port.

Also, a separate storage device on a communication network may connect to a portable electronic device.

As described above, the portable terminal according to embodiments of the present invention may allow the user to learn to a screen zoom-in and zoom-out method by sensing a circle or oval gesture of the user and zooming in or out and displaying a screen according to a radius of a circle or oval. The portable terminal may zoom in or out a screen to a desired size without repeating an operation in which the user touches and then removes his or her finger or stylus pen from the screen. The user of the portable terminal may save a separate waiting time for zooming in or out a screen.

Also, the portable terminal may reduce inconvenience in which the user must change a single gesture to a multi-touch when operating the portable terminal by allowing the user to perform a scaling (zoom-in/zoom-out) operation freely based on the single gesture.

While the present invention has been particularly shown and described with reference to exemplary embodiments thereof, it will be understood by those skilled in the art that various changes in form and details may be made therein without departing from the spirit and scope of the present invention as defined by the appended claims and their equivalents. Therefore, the scope of the present invention should not be limited to the above-described embodiments but should be determined by not only the appended claims but also the equivalents thereof.

What is claimed is:

1. A screen display control method in an electronic device, the screen display control method comprising:
   sensing a gesture input;
   determining whether the gesture input corresponds to a predetermined pattern of a first semicircle or semi oval shape; and zooming in or out an image displayed on the screen and displaying a zoomed in or zoomed out image on a screen, wherein the zoom ratio is in proportion to a radius of a first semicircle or a radius of a long or short axis of a first semi oval when the gesture input is the pattern of the first semicircle or semi oval shape, wherein the zoom-in or zoom-out and display of the screen in proportion to the radius of the first semicircle or the radius of the long or short axis of the first semi oval comprises:

zooming in the screen in proportion to the radius of the first semicircle or the radius of the long or short axis of the first semi oval with respect to a size of the screen when the first semicircle or semi oval is input in a first direction by a gesture, and zooming out the screen in proportion to the radius of the first semicircle or the radius of the long or short axis of the first semi oval with respect to a size of the screen when the first semicircle or semi oval is input in a second direction by a gesture.

2. The method of claim 1, further comprising:

holding the gesture input of the first semicircle or semi oval shape and sensing gesture input of a second semicircle or semi oval shape; and zooming in or out and displaying the screen additionally according to an arc length and direction corresponding to the second semicircle or semi oval shape.

3. The method of claim 2, wherein the zoom-in or zoom-out and display of the screen according to the arc length corresponding to the second semicircle or semi oval shape additionally comprises:

zooming in the screen in a proportion corresponding linearly to the arc length of the second semicircle or semi oval shape when a second semicircle or semi oval is input in a first direction by a gesture; and zooming out the screen in a proportion corresponding linearly to the arc length of the second semicircle or semi oval shape when the second semicircle or semi oval is input in a second direction with respect to the first direction by a gesture.

4. The method of claim 2, wherein the zoom-in or zoom-out and display of the screen according to the arc length corresponding to the second semicircle or semi oval shape additionally comprises:

zooming in the screen nonlinearly in a proportion corresponding linearly to the arc length corresponding to the second semicircle or semi oval shape when a second semicircle or semi oval is input in a first direction by a gesture; and zooming out the screen in a proportion corresponding nonlinearly to the arc length of the second semicircle or semi oval shape when the second semicircle or semi oval is input in a second direction with respect to the first direction by a gesture.

5. The method of claim 1, wherein when the first direction is a clockwise direction the second direction is a counterclockwise direction and wherein when the first direction is the counterclockwise direction the second direction is the clockwise direction.

6. The method of claim 1, further comprising calculating a radius of a first semicircle or semi oval, wherein the calculation of the radius of the first semicircle or semi oval comprises:

calculating a line segment between points forming the first semicircle or semi oval shape from an initial gesture point; and bisecting the line segment between the points forming the first semicircle or semi oval shape from the initial gesture point and calculating the length of the bisected line segment from a center point of the first semicircle or semi oval.

7. The method of claim 6, wherein the initial gesture point corresponds to a center point of a screen region where a user wants to initiate a zoom in or out operation of a screen display.

8. An electronic device having a screen display control comprising:

a touch screen configured to sense a gesture input; and a controller configured to determine whether the gesture input corresponds to a predetermined pattern of a first semicircle or semi oval shape and zooming in or out an image displayed on the screen and control the screen to display a zoomed in or zoomed out image on a screen, wherein the zoom ratio is in proportion to a radius of a first semicircle or a radius of a long or short axis of a first semi oval when the gesture input is the pattern of the first semicircle or semi oval shape, wherein the controller controls the screen to zoom in the screen display in a proportion corresponding to the radius of the first semicircle or the radius of the long or short axis of the first semi oval when the first semicircle or semi oval is input in a first direction by a Gesture and zoom out the screen in a proportion corresponding to the radius of the first semicircle or the radius of the long or short axis of the first semi oval when the first semicircle or semi oval is input in a second direction by a gesture.

9. The device of claim 8, wherein the touch screen holds the gesture input of the first semicircle or semi oval shape and senses gesture input of a second semicircle or semi oval shape, wherein the controller is configured to zoom in or out and display the screen an additional amount in proportion to an arc length corresponding to the second semicircle or semi oval shape.

10. The device of claim 9, wherein the controller controls the screen to zoom in the screen in a proportion corresponding linearly to the arc length corresponding to the second semicircle or semi oval shape when a second semicircle or semi oval is input in a first direction by a gesture and zoom out the screen in a proportion corresponding linearly to the arc length corresponding to the second semicircle or semi oval shape when the second semicircle or semi oval is input in a second direction by a gesture.

11. The device of claim 9, wherein the controller controls the screen to zoom in the screen in a proportion corresponding nonlinearly to the arc length corresponding to the second semicircle or semi oval shape when a second semicircle or semi oval is input in a first direction by a gesture and zoom out the screen in a proportion corresponding nonlinearly to the arc length corresponding to the second semicircle or semi oval shape when a second semicircle or semi oval is input in a second direction by a gesture.

12. The device of claim 8, wherein when the first direction is a clockwise direction then the second direction is a counterclockwise direction and wherein when the first direction is the counterclockwise direction then the second direction is the clockwise direction.

13. The device of claim 8, wherein the controller calculates a line segment between points forming the first semicircle or semi oval shape from an initial gesture point and bisects the line segment between the points forming the first semicircle or semi oval shape from the initial gesture point and calculating the length of the bisected line segment from a center point of the first semicircle or semi oval.

14. The device of claim 13, wherein the initial gesture point corresponds to a center point of a screen region where a user wants to initiate a zoom in or out operation of the screen display.

15. An electronic device comprising:
   a touch screen;
   one or more processors;
   a memory; and
   one or more programs, each of the one or more programs which is stored in the memory and is configured to be executed by one of the one or more processors,
   wherein each of the one or more programs includes an instruction for sensing gesture input, determining whether the gesture input corresponds to a predetermined pattern of a first semicircle or semi oval shape, and zooming in or out and displaying a screen in proportion to a radius of a first semicircle or a radius of a long or short axis of a first semi oval when the gesture input is the predetermined pattern of the first semicircle or semi oval shape, wherein the instruction for zooming in or out and displaying the screen in proportion to the radius of the first semicircle or the radius of the long or short axis of the first semi oval includes a first instruction for zooming in the screen in proportion to the radius of the first semicircle or the radius of the long or short axis of the first semi oval when the first semicircle or semi oval is input in a first direction by a gesture and where instructions for zooming in or out and displaying the screen in proportion to the radius of the first semicircle or the radius of the long or short axis of the first semi oval includes a second instruction for zooming out the screen in proportion to the radius of the first semicircle or the radius of the long or short axis of the first semi oval when the first semicircle or semi oval is input in a second direction by a gesture.

16. The electronic device of claim 15, wherein one of the one or more programs further includes an instruction for holding the gesture input of the first semicircle or semi oval shape, sensing gesture input of a second semicircle or semi oval shape, and zooming in or out and displaying the screen zoomed in or out an additional amount according to an arc length corresponding to the second semicircle or semi oval shape.

17. The electronic device of claim 16, wherein the instruction for additionally zooming in or out and displaying the screen according to the arc length corresponding to the second semicircle or semi oval shape includes an instruction for zooming in the screen in a proportion corresponding linearly to the arc length of the second semicircle or semi oval shape when a second semicircle or semi oval is input in a first direction by a gesture and zooming out the screen in a proportion corresponding linearly to the arc length of the second semicircle or semi oval shape when the second semicircle or semi oval is input in a second direction by a gesture.

18. The electronic device of claim 16, wherein the instruction for additionally zooming in or out and displaying the screen according to the arc length corresponding to the second semicircle or semi oval shape includes an instruction for zooming in the screen in a proportion corresponding nonlinearly according to the arc length of the second semicircle or semi oval shape when a second semicircle or semi oval is input in a first direction by a gesture and zooming out the screen in a proportion corresponding nonlinearly according to the arc length of the second semicircle or semi oval shape when the second semicircle or semi oval is input in a second direction by a gesture.

19. The electronic device of claim 15, wherein when the first direction is a clockwise direction then the second direction is a counterclockwise direction and wherein when the first direction is the counterclockwise direction then the second direction is the clockwise direction.

20. The electronic device of claim 15, wherein one of the one or more programs further includes an instruction for calculating a radius of a first semicircle or semi oval and wherein the instruction for calculating the radius of the first semicircle or semi oval includes an instruction for calculating a line segment between points forming the first semicircle or semi oval shape from an initial gesture point and bisecting the line segment between the points forming the first semicircle or semi oval shape from the initial gesture point and calculating the length of the bisected line segment from a center point of the first semicircle or semi oval.

21. The electronic device of claim 20, wherein the initial gesture point corresponds to a center point of a screen region where a user wants to initiate a zoom in or out operation of the screen display.

\* \* \* \* \*